United States Patent [19]

Takeuchi et al.

[11] Patent Number: 5,402,760
[45] Date of Patent: Apr. 4, 1995

[54] FUEL INJECTION CONTROL APPARATUS FOR INTERNAL COMBUSTION ENGINE

[75] Inventors: Yasuhiro Takeuchi, Okazaki; Hideo Sugimoto, Kariya; Tetsushi Natsume, Toyohashi; Hideo Uono, Nagoya, all of Japan

[73] Assignee: Nippondenso Co., Ltd., Kariya, Japan

[21] Appl. No.: 63,787

[22] Filed: May 20, 1993

[30] Foreign Application Priority Data

May 21, 1992 [JP] Japan ................................. 4-129088
Sep. 18, 1992 [JP] Japan ................................. 4-250105

[51] Int. Cl.$^6$ ........................ F02D 41/04; F02B 23/10
[52] U.S. Cl. ..................................... 123/300; 123/490
[58] Field of Search ........................ 123/299, 300, 490

[56] References Cited

U.S. PATENT DOCUMENTS

| | | | |
|---|---|---|---|
| 3,666,232 | 5/1972 | Melcher et al. | 251/129.15 |
| 3,727,592 | 4/1973 | Wilkinson | 123/490 |
| 4,452,210 | 6/1984 | Sasayama et al. | 123/490 |
| 4,579,096 | 4/1986 | Kobayashi et al. | 123/299 |
| 4,718,384 | 1/1988 | Takahashi | 123/300 X |
| 4,782,803 | 11/1988 | Kikuchi | 123/300 |

FOREIGN PATENT DOCUMENTS

| | | |
|---|---|---|
| 0245540 | 11/1987 | European Pat. Off. . |
| 0504401 | 9/1992 | European Pat. Off. . |
| 49-45248 | 12/1974 | Japan . |
| 62-129540 | 6/1987 | Japan . |
| 63-5140 | 1/1988 | Japan . |

OTHER PUBLICATIONS

"Patent Abstracts of Japan", vol. 11, No. 86 (M-572), Mar. 17, 1987, abstract of JP-A-61-241438.
"Patent Abstracts of Japan", vol. 14, No. 464 (M-1033), Oct. 9, 1990, abstract of JP-A-02-185650.
"Patent Abstracts of Japan", vol. 12, No. 121 (M-686), Apr. 15, 1988, abstract of JP-A-62-248853.
"Patent Abstracts of Japan", vol. 14, No. 217 (M-970), May 8, 1990, abstract of JP-A-02-049953.
"Development Of New Electronically Controlled Fuel Injection System ECD-U2 For Diesel Engines" by M. Miyaki et al SAE International; International Congress and Exposition, Detroit, Mich., Feb. 25-Mar. 1, 1991; pp. 1-17.

Primary Examiner—Tony M. Argenbright
Attorney, Agent, or Firm—Cushman, Darby & Cushman

[57] ABSTRACT

A pilot injection amount QP, a main injection amount QM, and a lag TDF between the main and pilot injections are obtained (S130). The pilot injection initiating timing TTP, the pilot injection period TP, the main injection initiating timing TTM, and the main injection period TM are obtained on the basis of the pilot injection amount QP, the main injection amount QM, the fundamental injection initiating timing KT and the common rail pressure Pc (S150). The main injection period correction amount ΔTQM and the injection initiating timing correction shift amount ΔT are then obtained on the basis of the pilot injection period TP and the time lag TDF (S160). Finally, modified by these correction amount ΔTQM and the shift amount ΔT, the pilot injection initiating timing TTP', the main injection initiating timing TTM' and the main injection period TM' are obtained as final values (S170). With this arrangement, a fuel injection control apparatus for an internal combustion engine becomes capable of reducing adverse affects of residual magnetic flux and the pressure pulsation in the fuel injection initiating timing of the main injection, thereby suppressing smoke generation and realizing an optimum fuel injection.

20 Claims, 17 Drawing Sheets

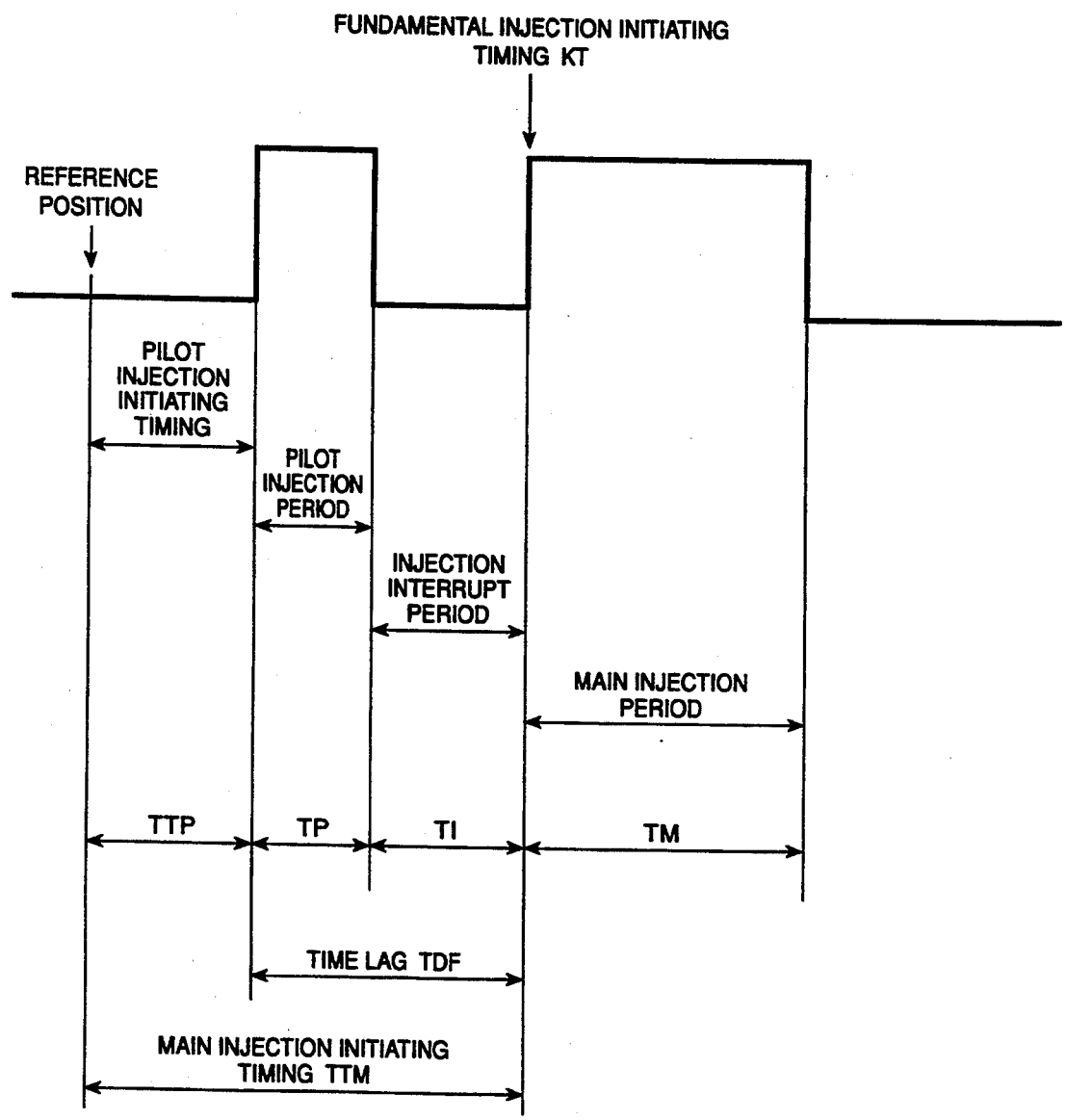

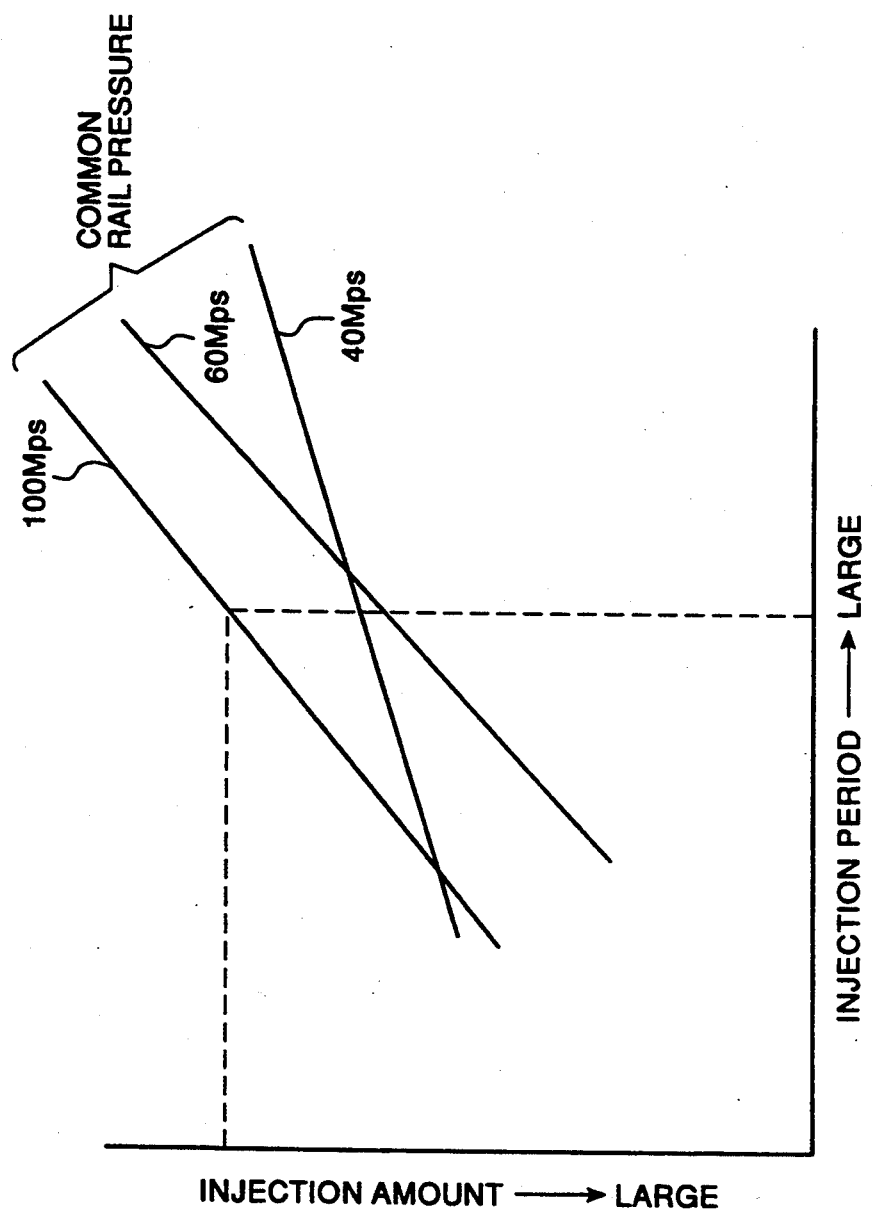

Fig. 10(A)

| PILOT INJECTION PERIOD TP (μS) | TIME LAG TDF (μS) | | | | |
|---|---|---|---|---|---|
| | 100 | 200 | ...... | 1900 | 2000 |
| 100 | 200 | 190 | ...... | 0 | 0 |
| 200 | 220 | 210 | ...... | 10 | 0 |
| 300 | 240 | 230 | ...... | 30 | 10 |
| ⋮ | ⋮ | ⋮ | ΔTQM | ⋮ | ⋮ |
| 1000 | 500 | 480 | ...... | 100 | 80 |

Fig. 10(B)

| PILOT INJECTION PERIOD TP (μS) | TIME LAG TDF (μS) | | | | |
|---|---|---|---|---|---|
| | 100 | 200 | ...... | 1900 | 2000 |
| 100 | 100 | 90 | ...... | 0 | 0 |
| 200 | 120 | 100 | ...... | 5 | 0 |
| 300 | 130 | 120 | ...... | 10 | 0 |
| ⋮ | ⋮ | ⋮ | ΔT | ⋮ | ⋮ |
| 1000 | 300 | 290 | ...... | 30 | 20 |

|  | LOW LOAD | MIDDLE LOAD | HIGH LOAD |
|---|---|---|---|
| HIGH SPEED | 3 | 4 | 5 |
| MIDDLE SPEED | 2 | 3 | 4 |
| LOW SPEED | 1 | 2 | 3 |

MODIFIED LEVEL L' = FUNDAMENTAL LEVEL L + F(WATER TEMP.)

FUEL INJECTION CONTROL APPARATUS FOR INTERNAL COMBUSTION ENGINE

BACKGROUND OF THE INVENTION

1. Field of The Invention

The present invention relates to a fuel injection control apparatus for an internal combustion engine, which controls an electromagnetic injector (fuel injection valve) to supply fuel into a combustion chamber of the internal combustion engine.

2. Description of The Prior Art

A highly-pressurized fuel injection apparatus, equipped with e.g. common rail type injectors, has been conventionally used as an apparatus supplying fuel into combustion chambers of a diesel engine. This type apparatus normally uses an injector having an electromagnetic valve to atomize fuel and supply it into the combustion chamber. In this case, an injection rate is univocally determined in accordance with a diameter of an injection nozzle of the injector and an injection pressure of the same.

In general, diesel engines have a disadvantage in generating a significant amount of combustion noise and NOx due to delay in firing fuel in the combustion chamber. This kind of noise or NOx problem cannot be solved by the injector itself, in the case where this injector has an injection rate being determined in the univocal manner as described above.

A known countermeasure solving this problem is a so-called pilot injection technology (For example, refer to Japanese Unexamined Patent Application Nos. SHO 63-5140 and 62-129540), in which a small amount of fuel is injected into the combustion chamber prior to an ordinary (main) fuel injection. According to this technology, the above problem can be solved by actuating the injector twice to inject fuel separately during one compression stroke of the diesel engine. However, this technology accompanies other problems as follows.

As the injector has a coil with a significant amount of inductance, an exciting current supplied to the injector causes a delay in its building-up stage due to this coil inductance. Namely, the injector causes a delay in the initiating stage of its fuel injection period. In order to solve this inherent delay accompanying the injector, there is known a technology disclosed, for example, in Japanese Patent No. SHO 49-45248.

In this conventional technology, the injector is supplied with two kinds of currents as shown in FIG. 20(a). One is a valve-opening current having a predetermined height and length corresponding to an injection pulse for an ordinary fuel injection. The other is an exciting current having a relatively high but short pulse waveform corresponding to a trigger pulse, which is given from a high-voltage generator.

This arrangement can improve the injector to promptly initiate fuel injection without causing an adverse delay.

However, if this technology is incorporated with the fuel injection system performing the pilot injection, an overall circuit configuration must become large in size. Because it requires a doubled-size circuit, comprising two independent current supply circuits for quickly discharging electrostatic energy charged in the capacitor, for supplying first and second, i.e. pilot and main, exciting currents corresponding to two injections as shown in FIG. 20(b).

Furthermore, as the injector has a solenoid to drive the electromagnetic valve, a residual magnetic flux remains in this solenoid due to an exciting current having flowed through the solenoid in response to the first activation of the injector (i.e. a pilot injection). Furthermore, a significant amount of pressure pulsation remains in the injector or its associated pressure pipe due to this pilot fuel injection.

The residual magnetic flux and pressure pulsation are not preferable for the precise injector control because they give adverse effect to the response speed of the injector. In this case the response speed becomes very fast; therefore, the fuel injection initiates earlier than an expected (commanded) timing, accompanied with an unanticipated increase in fuel injection amount due to this earlier valve opening.

In more detail, the residual magnetic flux is enlarged as a pilot injection period TP increases and an injection interrupt period TI decreases as shown in FIG. 2, which illustratively shows the relationship among the pilot injection period TP, the injection interrupt period TI, and the residual magnetic flux density.

Accordingly, a valve-opening time, i.e. a time lag between the current supply and an actual opening of the valve, becomes short with increasing residual magnetic flux density as shown in FIG. 3, which illustratively shows the relationship between the valve-opening time of the injector and the residual magnetic flux density. This gives adverse effect to the injection initiating timing and fuel injection amount in the second (main) activation of the injector executed after the first (pilot) injection.

As already explained in the foregoing description, providing a circuit for supplying a trigger pulse current in each activation of the injector is one of countermeasure for solving this problem but will not be preferable because of large size and complicatedness in its circuit configuration.

A means for supplying a preliminary current, as shown in Japanese Unexamined Patent Application No. SHO 62-276242, is also effective to solve this problem but will encounter with difficulties in ensuring valve closing and suppressing electric power consumption.

SUMMARY OF THE INVENTION

Accordingly, the present invention has a purpose; in view of above-described problems or disadvantages, to provide a novel fuel injection control apparatus for an internal combustion engine, in which the same electromagnetic valve performs both pilot and main injections in such a manner that the main injection is adjusted by taking account of a residual magnetic flux remaining in the electromagnetic valve after the pilot injection.

In more detail, the purpose of the present invention is to adjust an injection timing and/or an injection amount of the main injection on the basis of the residual magnetic flux remaining in the electromagnetic valve after the pilot injection.

Another purpose of the present invention is to change an injection rate of the main injection in its building-up stage, on the basis of the residual magnetic flux remaining in the electromagnetic valve after the pilot injection.

Still another purpose of the present invention is to realize the above adjustment of the injection timing and/or injection amount or injection rate change in the main injection without making the circuit configuration complicated and increasing electric power consumption.

In order to accomplish the above purposes, a first aspect of the present invention provides a fuel injection control apparatus for an internal combustion engine comprising:

a fuel injection valve for injecting fuel into an internal combustion engine;

an electromagnetic actuator for opening and closing the fuel injection valve;

a current supply means for supplying current to the electromagnetic actuator;

a sensor means for detecting a driving condition of the internal combustion engine;

a control means for controlling the electromagnetic actuator through the current supply means in response to an output of the sensor means, so as to adjust the fuel injection amount injected through the fuel injection valve in accordance with the driving condition of the internal combustion engine;

the control means comprising a pilot injection means for activating the electromagnetic actuator during a predetermined pilot injection period (TP) so as to cause the fuel injection valve to perform a pilot injection, an injection interrupt means for deactivating the electromagnetic actuator during a predetermined injection interrupt period (TI) so as to interrupt fuel injection after said pilot injection period (TP), and a main injection means for activating the electromagnetic actuator during a predetermined main injection period (TM) after the injection interrupt period (TI) so as to cause the fuel injection valve to perform a main injection; and an adjusting means for adjusting a timing and/or a length of at least either of the pilot injection period (TP), injection interrupt period (TI), and main injection period (TM) in response to the output of the sensor means, so that main fuel injection can be adjusted in accordance with a residual magnetic flux remaining in the electromagnetic actuator at an initiating timing of the main injection period (TM).

In accordance with the first aspect of the present invention, the adjusting means adjusts a timing and/or a length of at least either of the pilot injection period (TP), injection interrupt period (TI), and main injection period (TM). This adjustment can cause a change of the residual magnetic flux remaining in the electromagnetic actuator at the initiating timing of the main injection period (TM). A response of the electromagnetic actuator is therefore, in the main injection, improved so as to optimize the main fuel injection.

In order to obtain an optimum injection amount in the main fuel injection, it is preferable to adjust a length of the main injection period (TM) on the basis of an indication value representing a residual magnetic flux remaining in the electromagnetic actuator after the pilot injection period (TP), so as to compensate the affection given by the residual magnetic flux.

It is further preferable, in order to obtain the indication value representing the residual magnetic flux, to use the pilot injection period (TP) and/or a time lag (TDF) between the pilot and main injection periods in their injection initiating timings.

Moreover it is preferable, in order to obtain an optimum injection timing in the main fuel injection, to adjust a main injection timing (TTM) on the basis of an indication value representing a residual magnetic flux remaining in the electromagnetic actuator after the pilot injection period (TP), so as to compensate the affection given by the residual magnetic flux.

In order to obtain the indication value representing the residual magnetic flux, it is preferable to use the pilot injection period (TP) and/or a time lag (TDF) between the pilot and main injection periods in their injection initiating timings.

Still further, in order to obtain an optimum injection rate change in the main injection period, adjustment of the pilot injection period and/or the injection interrupt period is performed prior to the main injection period. With this adjustment, the residual magnetic flux can be adjusted before the main injection period starts. Thus, the response of the electromagnetic actuator is improved in the main injection period so as to optimize the injection rate change curve.

As described above, the present invention causes the current supply means to operate the fuel injector in accordance with the driving condition of the internal combustion engine, so as to supply exciting current to the driving solenoid of the fuel injection valve for fuel injection. Furthermore, in accordance with the present invention, two independent, i.e. pilot and main, current supply operations are sequentially carried out for the fuel injection in accordance with the driving condition.

The present invention further corrects the current supply pattern of the main current in accordance with the activated (magnetized) condition of the driving solenoid due to the pilot injection current supplied prior to the main injection. Hence, the current supply pattern of the main injection-varies in accordance with the activated (or magnetized) condition of the driving solenoid. Therefore, it becomes possible to suppress adverse affection of the residual magnetic flux caused by the pilot injection performed prior to the main injection or the pressure pulsation caused by the pilot injection. Thus, setting of the fuel injection amount and/or fuel injection timing is optimized to be a predetermined target value.

With this arrangement, the fuel injection amount and the fuel injection initiating timing are appropriately adjusted so as to reduce smoke, noise, and NOx.

Although the correction of the current supply pattern of the main current is executed in accordance with the activated (magnetized) condition caused by the pilot injection current supplied prior to the main injection current, this correction can be carried out in any way. For example, it will be possible for this purpose to correct either or both of the main injection period and the main injection initiating timing.

The activated (magnetized) condition of the driving solenoid prior to the main injection will be detected from the pilot injection period, the injection interrupt period between the pilot and main injection periods, the time lag in the injection initiating timing between the pilot and main injections, or their combinations. The current supply pattern of the main injection can be corrected in accordance with this detected condition.

Furthermore, it will be also preferable to change the current supply pattern of the pilot injection in accordance with the current supply pattern of the main injection, so as to compensate the adverse affection of main injection.

Above and other objects, features and advantages of the present invention will become more apparent from the following detailed description which is to be read in conjunction with the accompanying drawings.

BRIEF DESCRIPTION OF THE DRAWINGS

FIG. 8 is a timing chart showing a pilot injection period, an injection interrupt period, and a main injection period for the injector;

FIG. 9 is a graph showing a relationship between an injection amount and a current supply (i.e. injection) period;

FIGS. 10(A) and 10(B) are tables respectively listing correction data of a correction map;

DETAILED DESCRIPTION OF THE PREFERRED EMBODIMENTS

Hereinafter, with reference to accompanying drawings, preferred embodiments of the present invention will be explained in detail.

FIRST EMBODIMENT

Figure 1:
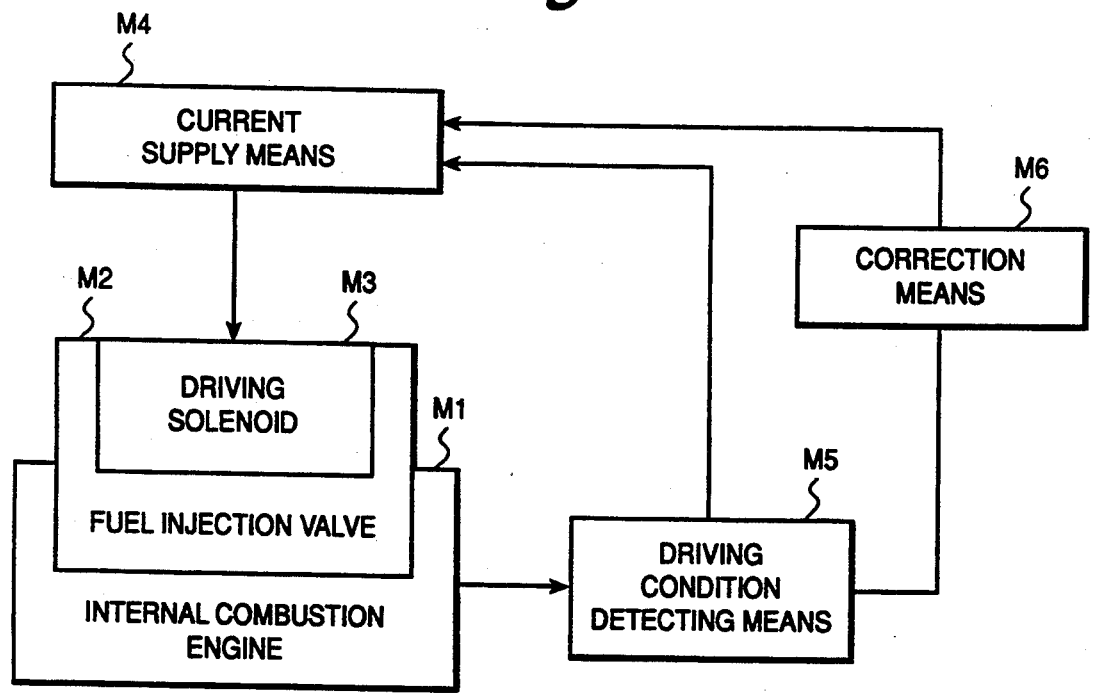
FIG. 1 is a schematic diagram exemplarily showing a fundamental constitution of the first embodiment.

FIG. 1 is a schematic diagram exemplarily showing a fundamental constitution of the first embodiment of a fuel injection control apparatus for an internal combustion engine. In FIG. 1, an internal combustion engine M1 is supplied with fuel by a fuel injection valve M2. This fuel injection valve M1 is actuated by a driving solenoid M3. A current supply means M4 supplies exciting current to the driving solenoid M3.

A driving condition detecting means M5 is provided for detecting a driving condition of the internal combustion engine M1. The current supply means M4 receives the driving condition detected by the driving condition detecting means M5 and sequentially supply an exciting current to the driving solenoid M3 of the fuel injection valve M2 during a predetermined pilot injection period and subsequently during a predetermined main injection period, so as to effect the fuel injection in accordance with the driving condition detected by the driving condition detecting means M5.

The fuel injection apparatus further includes a correction means M6, which corrects a current supply pattern of the main injection in accordance with the activated (magnetized) condition of the driving solenoid M2. That is, the residual magnetic flux remains in the driving solenoid M2 due to exciting current having flowed therethrough during the pilot injection period prior to the main injection period. This correction means M6 adjusts the fuel injection amount and/or fuel injection timing to a predetermined target value by taking account of the residual magnetic flux.

Figure 4:
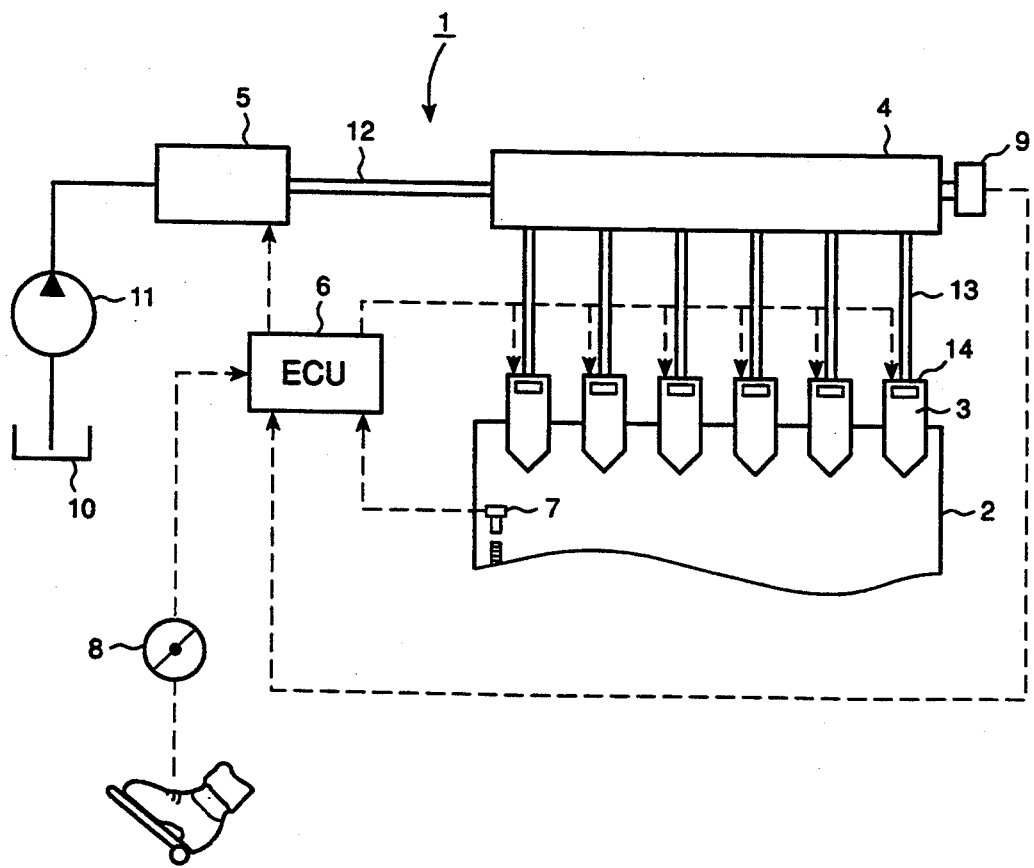
FIG. 4 is a view showing a system hardware of a fuel injection control apparatus embodying the present invention.

FIG. 4 is a view schematically showing an overall system hardware of the fuel injection control apparatus embodying the present invention.

As shown in the drawing, the fuel injection control apparatus 1 is an accumulator injection type. This injection control apparatus 1 includes a 4-cycle, 6-cylinder, diesel engine 2, fuel injection valves (i.e. injectors) 3 supplying atomized fuel directly into respective combustion chambers of the diesel engine 2, an accumulator (i.e. a common rail) 4 accumulating a pressurized fuel to be supplied to these injectors 3, a fuel supply pump 5 feeding a pressurized fuel into the common rail 4, and an electronic control unit (ECU) 6 controlling these units.

The fuel supply pump 5 sucks up fuel stored in a fuel tank 10 through a low-pressure pump 11 in accordance with a control command fed from the ECU 6, and thereafter, pressurizes this fuel to a higher pressure therein. Thus pressurized fuel is fed into the common rail 4 through a fuel feeding pipe 12.

Injectors 3 are connected through branch pipes 13 to the common rail 4 accumulating highly-pressurized fuel therein. An electromagnetic control valve 14, provided in each injector 3, opens or closes the fuel passage, so that an adequate amount of highly-pressurized fuel accumulated in the common rail 4 can be injected into the combustion chamber of the diesel engine 2.

The ECU 6 is associated with a rotational speed sensor 7 and an accelerator sensor 8 each serving as a driving condition detecting means. The rotational speed sensor 7 detects an engine rotational speed Ne, and the accelerator sensor 8 detects an accelerator opening degree Acc representing an engine load. Although not shown in the drawing, some other sensors such as a cooling water temperature sensor, an intake air temperature sensor, and an intake air pressure sensor are provided as one of a driving condition detecting means.

The ECU 6 receives the information detected by the driving condition detecting sensors (7, 8,---) and performs a feedback control of the common rail pressure to obtain an optimum fuel injection pressure, so that the combustion condition of the diesel engine 2 can be optimized in accordance with the detected driving condition.

Furthermore the ECU 6 performs the fuel injection control, which will be described later in detail, by actuating the control valve 14 of the injector 3 on the basis of the engine rotational speed Ne detected by the rotational speed sensor 7 and the accelerator opening degree Acc detected by the accelerator sensor 8.

Figure 5:
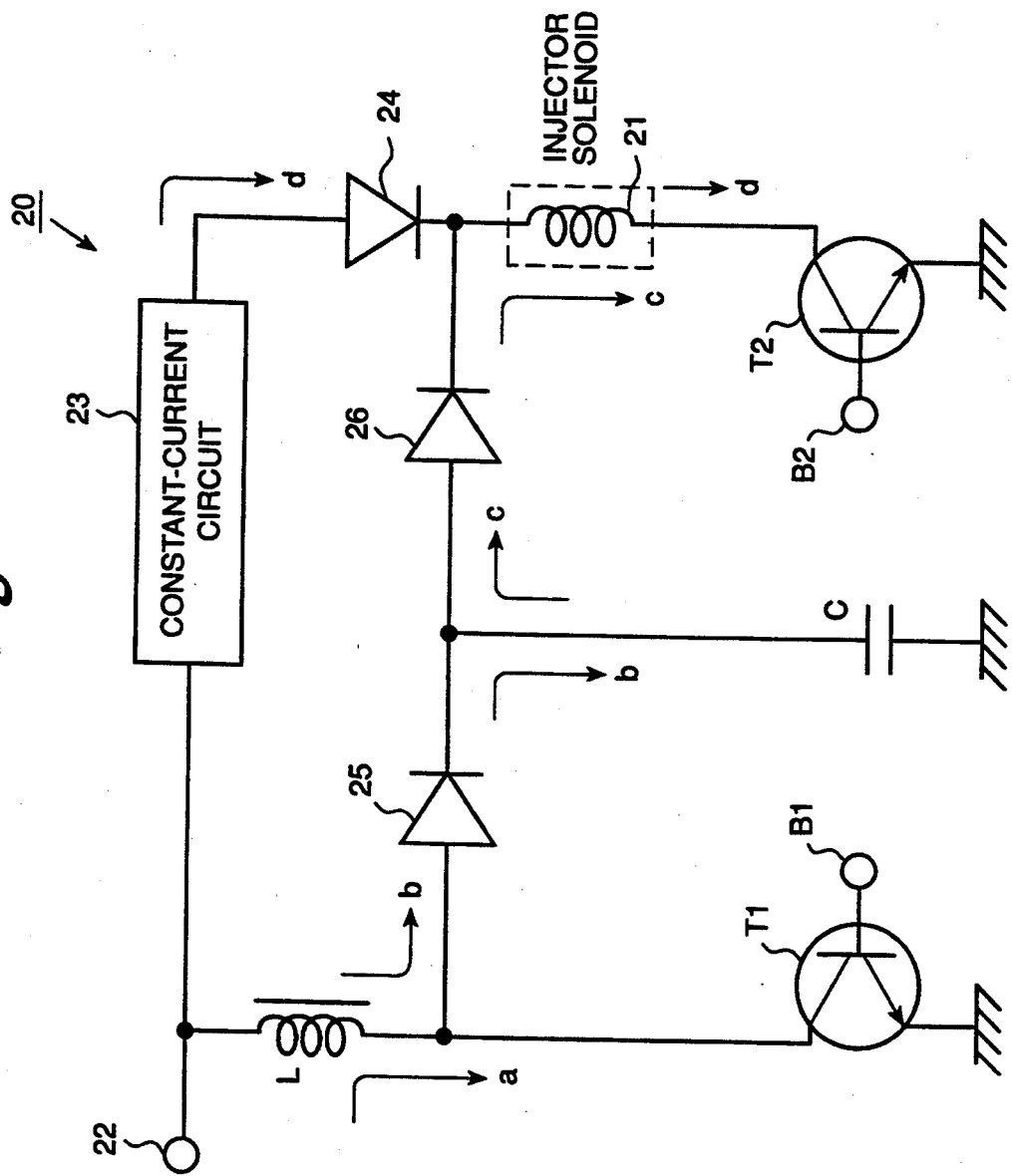
FIG. 5 is a circuit diagram showing an injector actuation circuit.

Opening and closing operation of this control valve 14 provided in each injector 3 is executed by an injector actuating circuit 20 shown in FIG. 5 on the basis of an injection control command which is fed from the ECU 6. This injector control command is given for on-off controlling the injector solenoid 21 of the control valve 14 to adjust the fuel injection amount and/or fuel injection timing, and its value is calculated on the basis of detected signals obtained from the rotational speed sensor 7, the accelerator sensor 8 and others. The ECU 6 outputs this injection control command at predetermined timings based on the information detected from the rotational speed sensor 7, a cylinder discrimination sensor (not shown), and others.

The control command to be fed to the fuel supply pump 5 is also output at predetermined timings based on the information detected from the rotational speed sensor 7, the common rail pressure sensor 9, the cylinder discrimination sensor and others.

Next, a circuit configuration of the injector actuation circuit 20 will be explained in detail with reference to FIG. 5.

As shown in FIG. 5, the injector actuating circuit 20 includes a charge coil L and a first switching transistor T1, which are connected in series between an electric power source terminal 22 and the ground. In the same way, a constant-current circuit 23, a first diode 24, an injector solenoid 21, and a second switching transistor T2 are connected together in series between an electric power source terminal 22 and the ground.

Second and third diodes 25, 26 interpose between a downstream end of the coil L and an upstream end of the injector solenoid 21. A capacitor C is connected at one end between these diodes 25, 26 and connected at the other end to the ground. Transistors T1, T2 are connected with the ECU 6 at their base terminals B1, B2, respectively. Emitters E1, E2 of the transistors T1, T2 are grounded.

The ECU 6 supplies on-off control signals to the base terminal B1 of the first transistor T1, so that the constant voltage can be charged in the capacitor C. Furthermore, the ECU 6 supplies an injector driving signal to the base terminal B2 of the second transistor T2.

An operation of this injector actuating circuit 20 will be explained below.

First of all, when the first transistor T1 is turned on, a current flows from the electric power source terminal 22 through the coil L along an arrow a. In this instance, the second transistor T2 is in a turning-off state.

Next, when the first transistor T1 is turned off, an inductance of the coil L causes a current to flow along an arrow b to charge the capacitor C. If the capacitor C is fully charged, the preparation for the fuel injection is completed.

Subsequently, when the second transistor T2 is turned on, a large current is discharged in a moment from the capacitor C along an arrow c to give an exciting current to the injector solenoid 21. At the same time, the constant-current circuit 23 causes a constant current to flow along an arrow d to give a valve-opening current to the injector solenoid 21. In this manner, the injector 3 is activated by both the exciting current and the valve-opening current.

The activation of the second transistor T2 is repeated twice to supply the injector solenoid 21 the valve-opening current twice during one compression stroke in each combustion chamber of the diesel engine 2. That is, two, i.e. pilot and main, injections are sequentially performed in accordance with predetermined pilot and main injection periods in the vicinity of the top dead center of the compression stoke. An injection interrupt period, during which the injector is deactivated to halt the fuel injection, is provided between these pilot and main injection periods.

In this pilot injection, the injector solenoid 21 is supplied with both the exciting current and the valve-opening current. As electric charge stored in the capacitor C is entirely discharged in this pilot injection period, only the valve-opening current flows in the main injection period.

Figure 6:
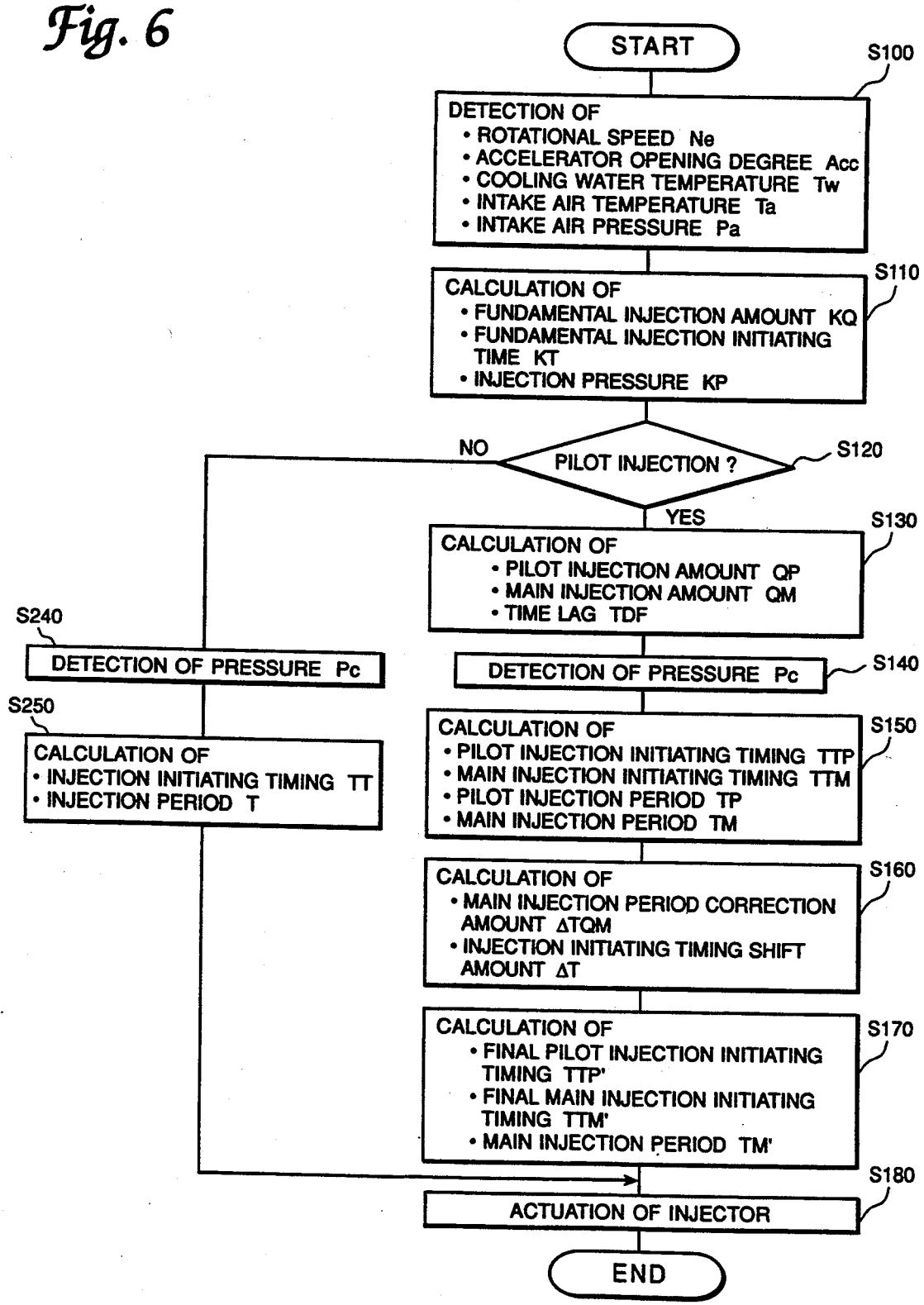
FIG. 6 is a flowchart showing a control procedure of the fuel injection control in accordance with the first embodiment.

Explained next, with reference to the flowchart of FIG. 6, will be a control procedure for actuating the injector 3 which the ECU 6 executes by use of this injector actuating circuit 20.

First, in a step S100, the ECU 6 detects through various sensors the driving condition of the engine 2 such as an engine rotational speed Ne, an accelerator opening degree Acc, a cooling water temperature Tw, an intake air temperature Ta, an intake air pressure Pa and others.

In a subsequent step S110, the ECU 6 calculates fundamental control values such as a fundamental injection amount KQ, i.e. a total injection amount as a summation of a pilot injection amount QP and a main injection amount QM, a fundamental injection initiating timing KT, and an injection pressure KP on the basis of the detected driving condition.

Next in a step S120, the ECU 6 judges whether or not the pilot injection should be effected. If the judgement in this step S120 is YES, the ECU 6 proceeds to a step S130. On the contrary, if the judgement in this step S120 is NO, the ECU 6 proceeds to a step S240, a content of which will be described later in detail.

In a step S130, the ECU 6 calculates a pilot injection amount QP together with a time lag TDF between the pilot and main injections, i.e. a time difference in their injection initiating timings. Furthermore, the main injection amount QM is obtained by subtracting the pilot injection amount QP from the fundamental injection amount KQ.

Figure 7A:
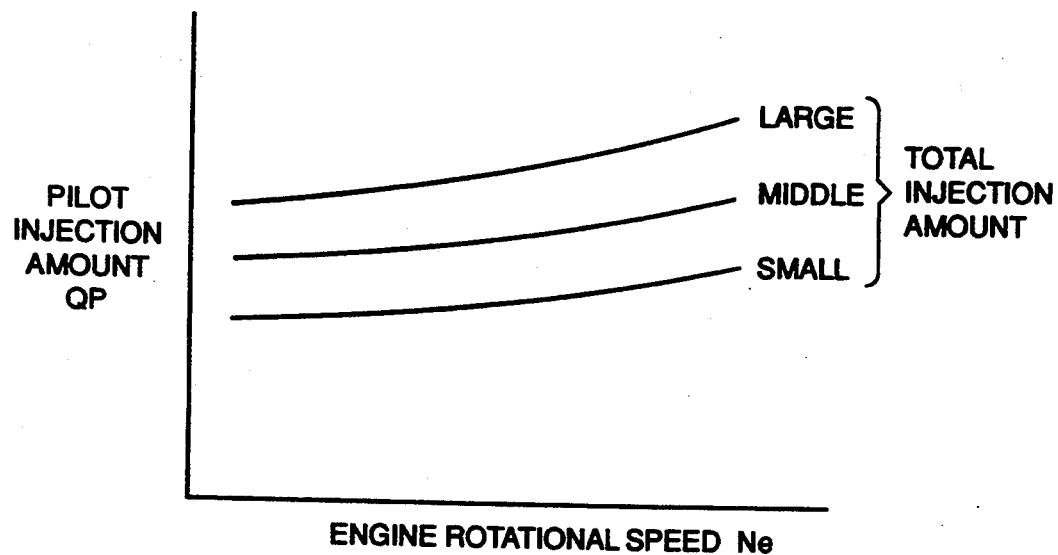
FIGS. 7(A) and 7(B) are graphs respectively showing a map for determining a pilot injection pattern.
Figure 7B:
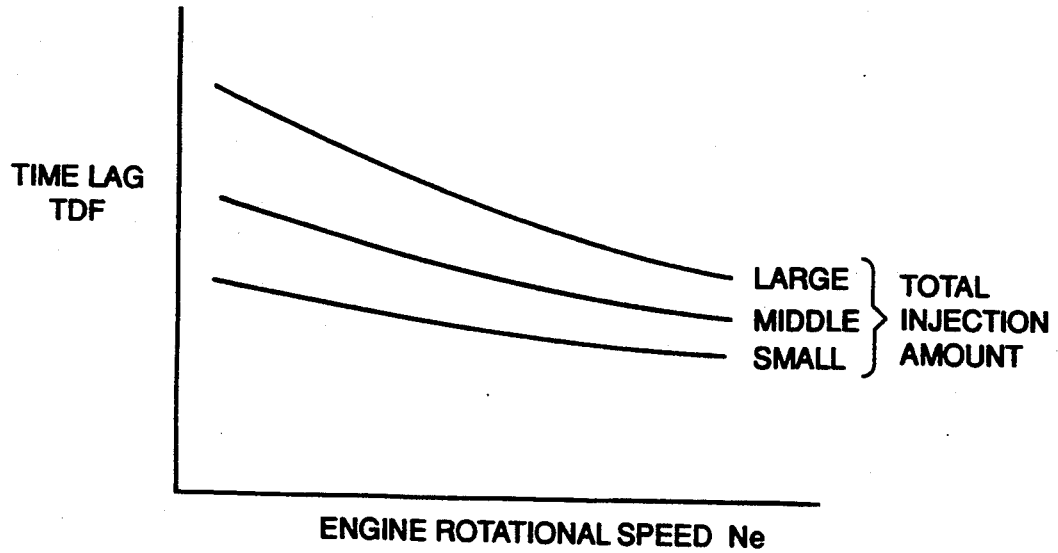

The pilot injection amount QP and the time lag TDF are obtained from the map shown in FIGS. 7(A) and 7(B) by using parameters of the engine rotational speed Ne and the fundamental injection amount (i.e. total injection amount) KQ calculated in the step S110.

These pilot injection amount QP and the time lag TDF are then corrected in accordance with the cooling water temperature Tw, the intake air temperature Ta, the intake air pressure Pa and others.

Next in a step S140, the ECU 6 detects a common rail pressure Pc. Furthermore in a step S150, the ECU 6 calculates several injection initiating timings and injection periods as fundamental but temporary data (which will be corrected later) on the basis of the pilot injection amount QP, the main injection amount QM, the fundamental injection initiating timing KT, and the common rail pressure Pc obtained in the previous steps S100 through S140. In more detail, as shown in FIG. 8, these temporary fundamental data include the following four data: the pilot injection initiating timing TTP measured from the predetermined reference crank angle; the pilot injection period TP, corresponding to the pilot injection amount QP; the main injection initiating timing TTM; and the main injection period TM, corresponding to the main injection amount QM.

Next explained will be a procedure for calculating the pilot injection initiating timing TTP, the pilot injection period TP, the main injection initiating timing TTM, and the main injection period TM.

(1) The main injection initiating timing TTM corresponds to the fundamental injection timing KT obtained in the step S110. This timing TTM is expressed in terms of an elapsed time from the reference engine crank angle.

(2) The pilot injection initiating timing TTP is determined as a timing retroacting from the main injection initiating timing TTM by an amount corresponding to the time lag (i.e. injection initiating timing difference) TDF obtained in the step S130.

(3) The pilot injection period TP is obtained from the map shown in FIG. 9 in accordance with the parameters of the injection amount (i.e. pilot injection amount QP) obtained in the S130 and the common rail pressure Pc detected in the step S140.

(4) The main injection period TM is also obtained from the map shown in FIG. 9 in accordance with the parameters of the injection amount (i.e. main injection amount QM) obtained in the step S130 and the common rail pressure Pc detected in the step S140.

Next, in a step S160, the ECU 6 obtains a correction amount ΔTQM of the main injection period TM and a correction amount ΔT of the pilot and main injection initiating timings TTP, TTM on the basis of the pilot injection period TP obtained in the step S150 and the time lag TDF obtained in the step S130.

That is, the main injection period correction amount ΔTQM (this correction amount is expressed in terms of current supply time (μs)) is obtained from the map shown in FIG. 10(A). Furthermore, the injection initiating timing correction shift amount ΔT (an amount for shifting the pilot and main injection initiating times TTP, TTM) is obtained from the map shown in FIG. 10(B). By the way, these maps shown in FIGS. 10(A) and 10(B) are prepared more with respect to different common rail pressures, so as to constitute a three-dimensional interpolation map system.

Next in a step S170, the ECU 6 modifies the main injection period TM and the pilot and main injection initiating timings TTP, TTM on the basis of the main injection period correction amount ΔTQM and the injection initiating timing correction shift amount ΔT.

Namely, the final main injection period TM' is obtained in accordance with the following equation (1), wherein the main injection period TM is modified in accordance with the main injection period correction amount ΔTQM.

$$TM' = TM - \Delta TQM \quad (1)$$

That is, the final main injection period TM' is reduced by taking account of the influence of the residual magnetic flux in the driving solenoid. As shown in FIG. 10(A), the main injection period correction amount ΔTQM increases as the pilot injection period TP increases. In other words, the final main injection period TM' decreases with increasing pilot injection period TP. On the contrary, in FIG. 10(A), the main injection period correction amount ΔTQM decreases as the time lag TDF increases. Therefore, the final main injection period TM' decreases with decreasing time lag TDF.

Furthermore, the final pilot and main injection initiating timings TTP' and TTM' are obtained in accordance with the following equations (2) and (3), wherein the pilot and main injection initiating timings TTP and TTM are modified in accordance with the injection initiating timing correction shift amount ΔT.

$$TTP' = TTP + \Delta T \quad (2)$$

$$TTM' = TTM + \Delta T \quad (3)$$

That is, the final pilot and main injection initiating timings TTP' and TTM' are delayed by taking account of the influence of the residual magnetic flux in the driving solenoid. As shown in FIG. 10(B), the injection initiating timing correction shift amount ΔT increases as the pilot injection period TP increases. Therefore, the final pilot and main injection initiating timings TTP' and TTM' delay with increasing pilot injection period TP. On the contrary, in FIG. 10(B), the injection initiating timing correction shift amount ΔT decreases as the time lag TDF increases. Therefore, the final pilot and main injection initiating timings TTP' and TTM' delay with decreasing time lag TDF.

Thereafter in a step S180, the ECU 6 actuates the injector 3 on the basis of the final pilot injection initiating timing TTP', the pilot injection period TP, the final main injection initiating timing TTM', the final main injection period TM' and others, and then completes this procedure.

On the other hand, when the ECU 6 proceeds to a step S240 after making a judgement of not performing the pilot injection in the previous step S120, the common rail pressure Pc is detected in this step S240.

In a subsequent step S250, the ECU 6 calculates the injection initiating timing TT and the injection period T on the basis of the fundamental injection amount KQ, the fundamental injection initiating timing KT and the common rail pressure Pc. The injection initiating timing TT represents an elapsed time measured from the reference crank angle of the engine 2 as well as the main injection initiating timing TTM shown in FIG. 8. Furthermore, the injection period T is obtained from the map of FIG. 9 based on the parameters of the fundamental injection amount KQ obtained in the step S110 and the common rail pressure Pc detected in the step S240. Then in the step S180, the ECU 6 actuates the injector 3 on the basis of thus obtained injection initiating timing TT and the injection period T, and subsequently completes this procedure.

In this manner, the present embodiment first of all calculates the main injection amount QM and the pilot injection amount QP in accordance with the driving condition, as well as the time lag (i.e. injection initiating timing difference) TDF between the pilot injection and the main injection. Further, the pilot injection initiating timing TTP, the pilot injection period TP, the main injection initiating timing TTM, and the main injection period TM are obtained on the basis of the resultant values through above calculation.

Among these calculated values, the values TTP, TTM, and TM are further corrected by use of the map data for the main injection period correction amount ΔTQM and the injection initiating timing shift amount ΔT, so as to obtain the final pilot injection initiating timing TTP', the final main injection initiating timing TTM', and the final main injection period TM'. Then, the injector 3 is actuated based on these resultant final values.

Namely, the correction of reducing the main injection amount QM by use of the pilot injection amount QP or the time lag (injection initiating timing difference) TDF enables the engine 2 to be supplied with an optimum amount of fuel in accordance with the driving condition. Hence, it becomes possible to remarkably suppress smoke generating even in the case where the pilot injection is effected.

Moreover, as the initiating timings of both the pilot injection and the main injection can be corrected toward delayed timings on the basis of the pilot injection amount QP or the time lag (injection initiating timing difference) TDF, the fuel supply into the engine 2 can be carried out at an appropriate timing in accordance with the driving condition. Thus, this brings an advantage of reducing a significant amount of noise and NOx.

Figure 11A:
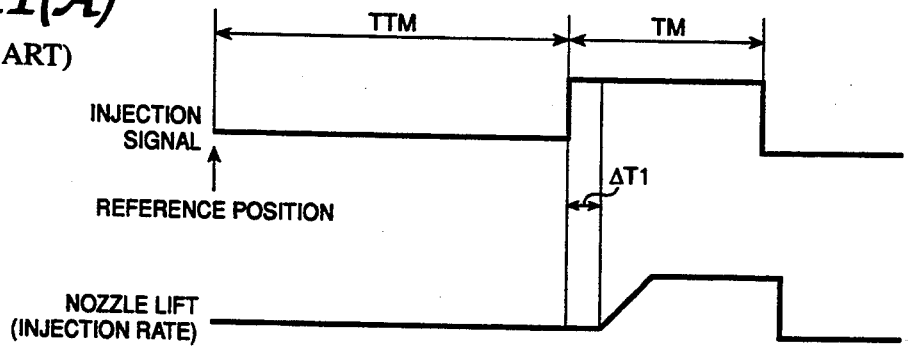
FIGS. 11(A), 11(B), and 11(C) are views illustrating the first embodiment and two prior arts for comparing functional difference therebetween.
Figure 11B:
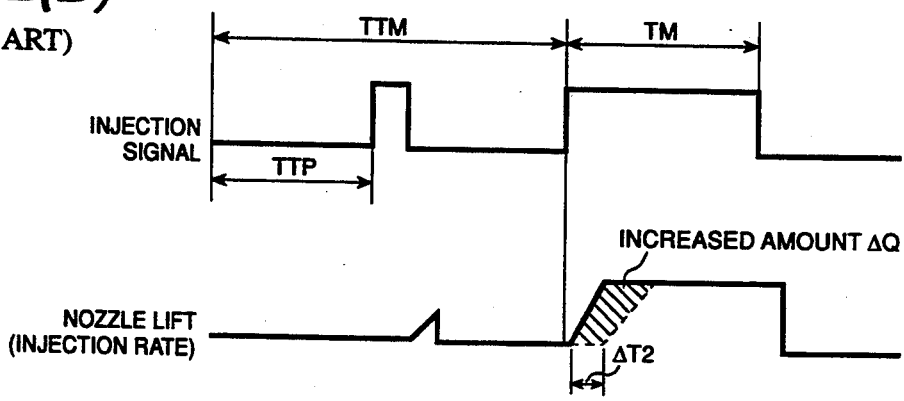

Function of the present embodiment will be explained in detail with reference to FIG. 11, which shows the functional comparison between the present embodiment and two prior arts. FIG. 11(A) shows a conventional example adopting only the main injection. FIG. 11(B) shows another conventional example adopting the pilot injection prior to the main injection. Meanwhile, FIG. 11(C) shows the present embodiment.

As shown in FIG. 11(A), an actual injection timing (rate) of the main injection, i.e. an nozzle lift of the injector, delays with respect to the injection signal (i.e. current supply signal) by an amount of $\Delta T1$ in the case where no pilot injection is executed together with the main injection. On the contrary, as shown in FIG. 11(B), the injection timing (rate) of the main injection advances $\Delta T2$ from the position of FIG. 11(A) by the presence of pilot injection, due to the residual magnetic flux etc. Therefore, the main injection amount increases by an amount $\Delta Q$ which is equivalent to this advance.

Figure 11C:
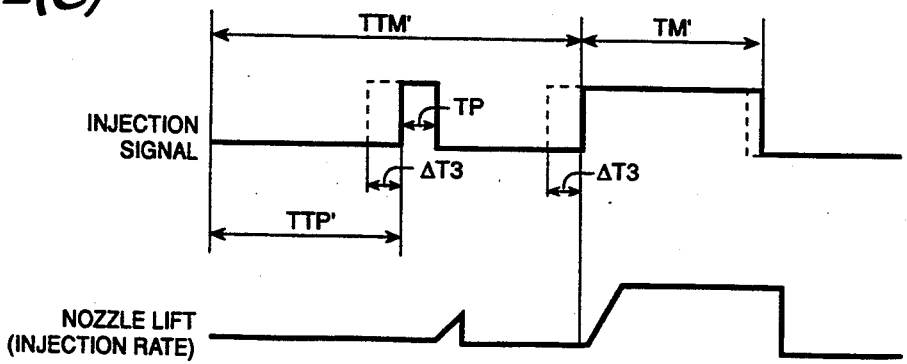

The present embodiment, however, allows the injection signal to shift from a dotted line to a solid line as shown in FIG. 11(C) in accordance with the parameters of the pilot injection period TP and the time lag TDF between the pilot and main injection initiating timings. That is, the main injection period is shortened and therefore the main injection amount is correspondingly reduced to suppress smoke generating.

Furthermore, the pilot and main injection initiating timings are both shifted by $\Delta T3$ in accordance with above parameters. This enables the actual injection initiating timings of both the pilot and main injections to be appropriately corrected. Thus, noise and NOx can be reduced.

In FIGS. 11(A), 11(B), and 11(C), TP, TTM, TM, and TTP represent the pilot injection period, the main injection initiating timing being not corrected yet, the main injection period being not corrected yet, and the pilot injection initiating timing being not corrected yet, respectively. On the other hand, TTM', TM', and TTP' represent the main injection initiating timing having already been corrected, the main injection period having already been corrected, and the pilot injection initiating timing having already been corrected, respectively.

Although the disclosed embodiment uses one discharge circuit consisting of the coil L, the capacitor C, and the transistor T1, the present invention does not exclude an attempt to provide one more discharge circuit for supplying exciting current to the pilot injection and the main injection independently. It will reduce the dispersion in the injection initiating timing of each injection.

Otherwise, instead of providing above discharge circuit, the constant-current circuit 23 will be able to supply current for both pilot and main injections.

Furthermore, although the parameter used in FIG. 10 is the time lag (i.e. injection initiating timing difference) TDF, the injection interrupt period TI can be also used as the parameter.

Still further, although the above-described embodiment corrects the main injection period and the pilot and main injection initiating timings, it will be also preferable to correct the main injection period only or the main injection initiating timing only. Yet further, it will be preferable to correct the target injection amount or the target injection timing so as to indirectly correct the injection period or the injection initiating timing without directly correcting the injection period and the injection initiating timing.

As is explained in the foregoing description, the present embodiment allows the current supply pattern of the main injection to be corrected in accordance with the activated (magnetized) condition of the driving solenoid. That is, it becomes possible to vary the current supply pattern of the main injection in accordance with the activated (magnetized) condition of the driving solenoid prior to the main injection. With this arrangement, it becomes possible to suppress the adverse affection by the residual magnetic flux caused due to the pilot injection current supplied prior to the main injection current or by the pressure pulsation caused by the pilot fuel injection. Thus, the fuel injection amount and/or fuel injection timing will be set to an optimum value in the main injection.

As a result, the present embodiment enables the diesel engine to reduce not only smoke but noise and NOx even in the case where the pilot injection is executed.

SECOND EMBODIMENT

Figure 12:
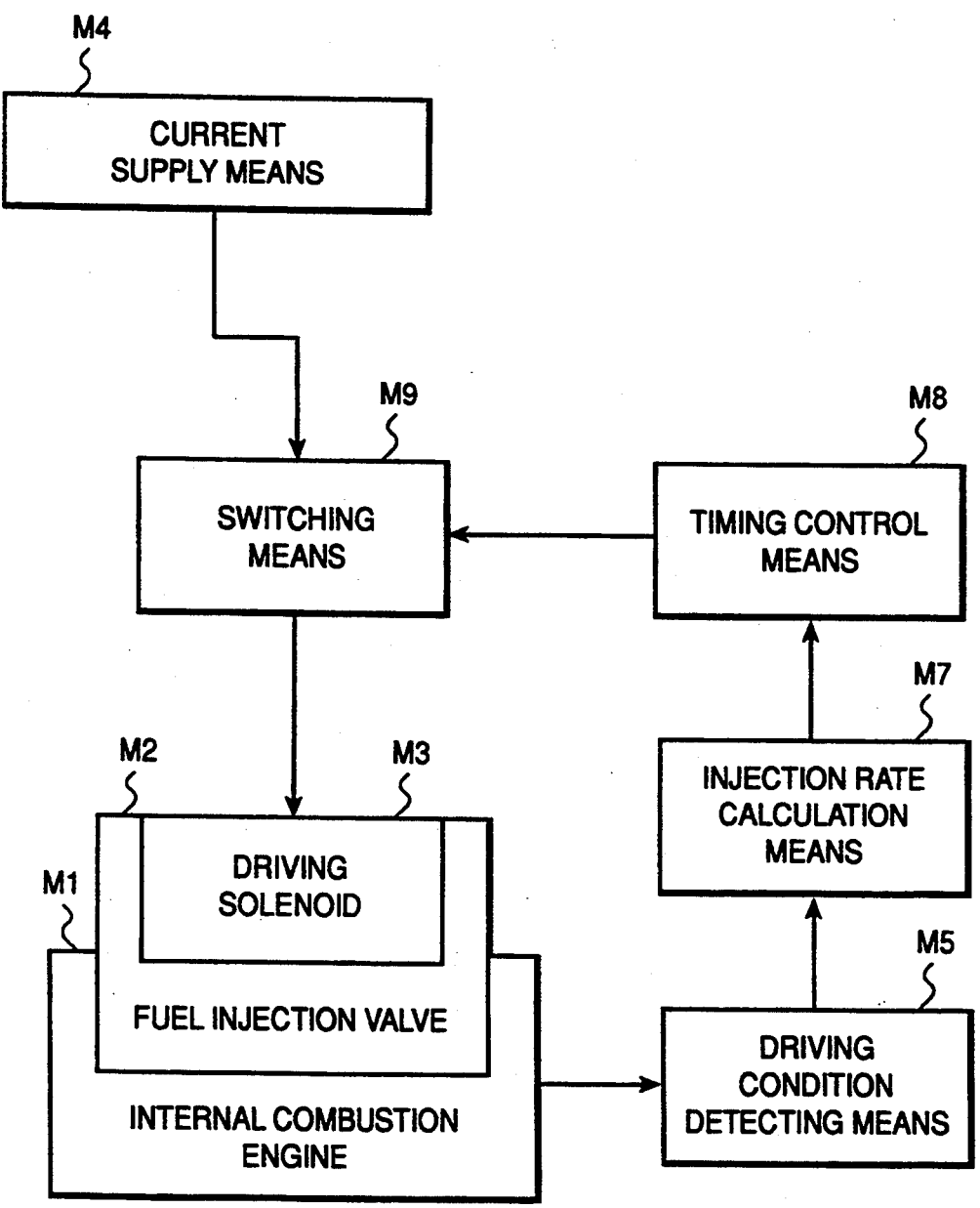
FIG. 12 is a schematic diagram exemplarily showing a fundamental constitution of the second embodiment.

FIG. 12 is a schematic diagram exemplarily showing a fundamental constitution of the second embodiment of the fuel injection control apparatus for an internal combustion engine. In FIG. 12, an internal combustion engine M1 is supplied with fuel by a fuel injection valve M2. This fuel injection valve M2 is actuated by a driving solenoid M3. A current supply means M4 is provided for supplying exciting current to the driving solenoid M3. A switching means M9 interposes between the driving solenoid M3 and the current supply means M4, for on-off controlling a circuit of the driving solenoid M3.

A driving condition detecting means M5 is provided for detecting a driving condition of the internal combustion engine M1. This driving condition detecting means M5 is connected with the injection rate calculation means M7, which calculates an injection rate for the fuel injection valve M2 in accordance with the driving condition detected by the driving condition detecting means M5. Furthermore, a timing control means M8 is provided for setting a pilot injection period TP during which an exciting current is supplied to the driving solenoid M3 prior to the opening of the fuel injection valve M2, a main injection period TM during which the fuel injection valve M2 is opened, and an injection interrupt period TI provided between the pilot and main injection periods TP and TM in accordance with the injection rate obtained by the injection rate calculation means M7.

Then, the timing control means M8 actuates the switch means M9 in accordance with above setting prior to the main injection period, so as to adjust a residual magnetic flux remaining in the driving solenoid M3 caused due to pilot injection current.

In accordance with this second embodiment, the fuel injection control apparatus for an internal combustion engine causes the current supply means M4 to supply an exciting current to the driving solenoid M3 of the fuel injection valve M2 equipped in the internal combustion engine M1.

The driving condition detecting means M5 detects the driving condition such as a rotational speed Ne or a load (e.g. accelerator opening degree Acc) of the internal combustion engine M1. On the basis of detected driving condition, the injection rate calculation means M7 obtains the injection rate for the fuel injection valve M2. Furthermore, the timing control means M8 sets the pilot and main injection periods TP and TM on the basis of this injection rate, and further actuates the switch means M9 which on-off controls the circuit for the driving solenoid M3 in accordance with this setting so as to adjust the turning on-and-off timing of the circuit for the driving solenoid M3.

Namely, the timing control means M8 serves as a control means for varying the pilot injection period TP, the main injection period TM, and the injection interrupt period TI by adjusting the turning on-and-off timing of the circuit for the driving solenoid M3. Therefore, it becomes possible, before the main injection period initiates, to adjust an amount of the residual magnetic flux remaining in the driving solenoid caused due to the pilot injection current. This adjustment of the residual magnetic flux will realize a fine adjustment of the fuel injection rate in the very beginning of the main fuel injection.

Figure 13A:
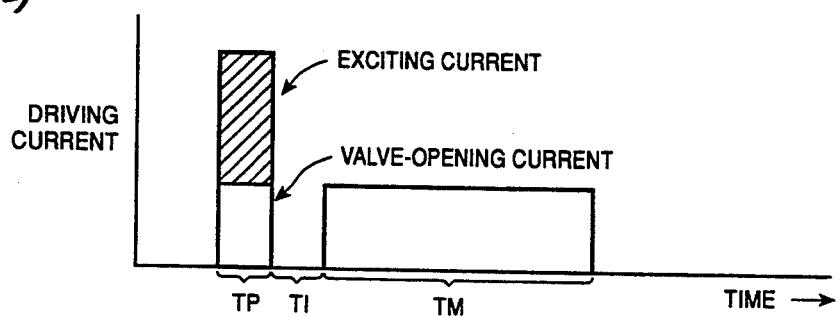
FIGS. 13(A) through 13(D) are views illustrating the principle of the second embodiment.
Figure 13B:
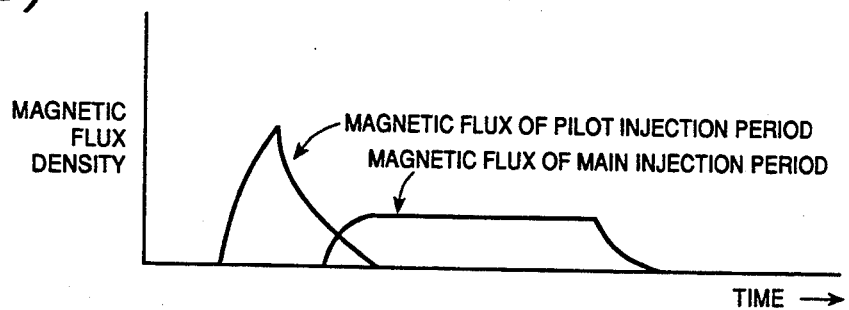
Figure 13C:
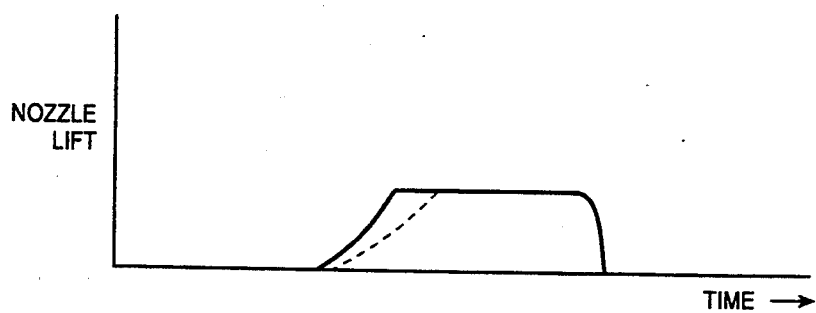
Figure 13D:
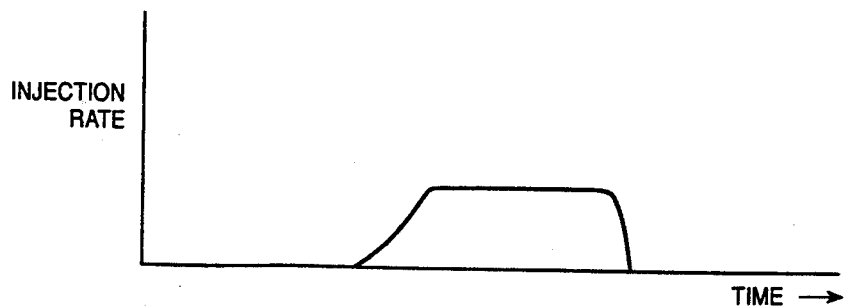

For example, the timing control means M8 adequately sets the pilot injection period TP, the injection interrupt period TI, and the main injection period TM as shown in FIG. 13(A). With this setting, a magnetic flux of the driving solenoid M3 caused during the pilot injection period TP overlaps, before extinguishing, with another magnetic flux newly caused by the main injection period TM partly, i.e. at the very beginning of the main injection period, as shown in FIG. 13(B). A nozzle lift amount of the fuel injection valve M2 increases as shown in FIG. 13(C) with a predetermined increasing rate corresponding to the overlap amount between two magnetic fluxes (i.e. a residual magnetic flux amount). For the comparison, a dotted line in FIG. 13(C) shows a slow increase of the nozzle lift in case of no pilot injection period TP adopted. As a result, in accordance with this nozzle lift, an initial injection rate in an actual fuel injection varies as shown in FIG. 13(D).

Figure 2:
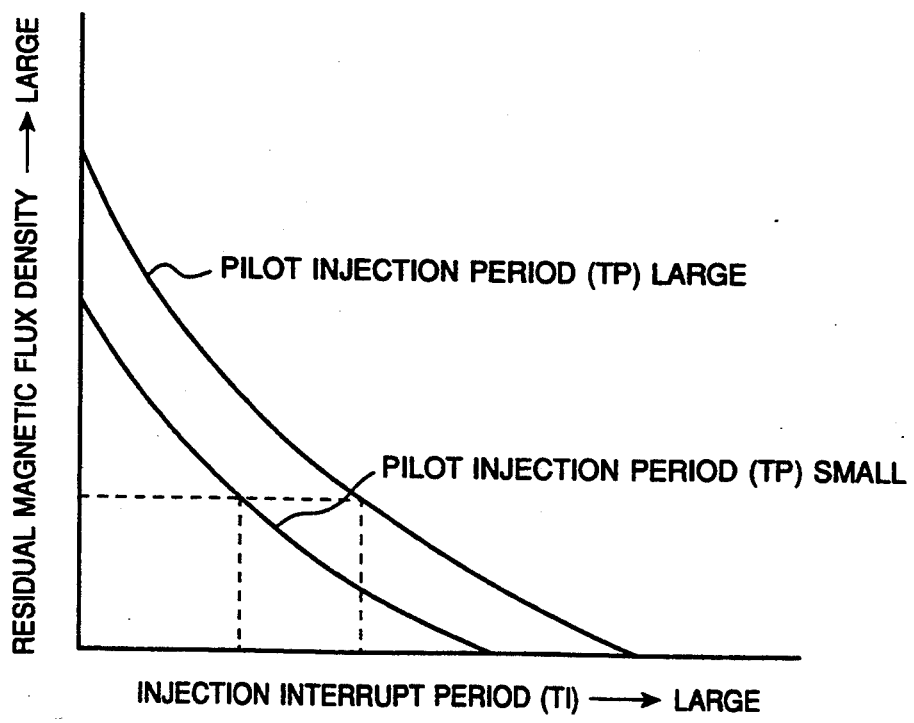
FIG. 2 is a graph showing a relationship among a magnetic flux density, a pilot injection period, and an injection interrupt period.
Figure 3:
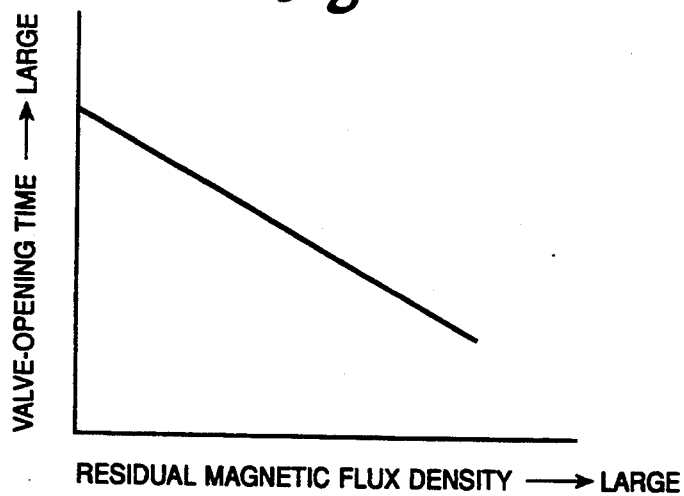
FIG. 3 is a graph showing a relationship between a valve-opening time and the magnetic flux density.

As explained with reference to FIG. 2, the magnetic flux density becomes large as the pilot injection period TP increases or the injection interrupt period TI decreases. Exciting energy for activating the fuel injection valve M2 increases with increasing magnetic flux density. Also as explained with reference to FIG. 3, the valve-opening time is reduced with increasing magnetic flux density.

Utilizing these characteristics, the present embodiment causes the timing control means M8 to adjust the pilot injection period TP, the main injection period TM, and the injection interrupt period TI for actuating the fuel injection valve M2, so as to vary the initial injection rate (building-up) in order to realize an optimum fuel injection control.

Hereinafter, with reference to accompanying drawings, the second embodiment of the present invention will be explained in detail.

An overall system hardware of the fuel injection control apparatus in accordance with the second embodiment is identical with the one disclosed in FIG. 4. And, an injector actuating circuit 20 for the second embodiment is also identical with the one disclosed in FIG. 5. Therefore, the overall system hardware and the injector actuating circuit 20 will not be explained further with reference to the drawings.

Figure 14:
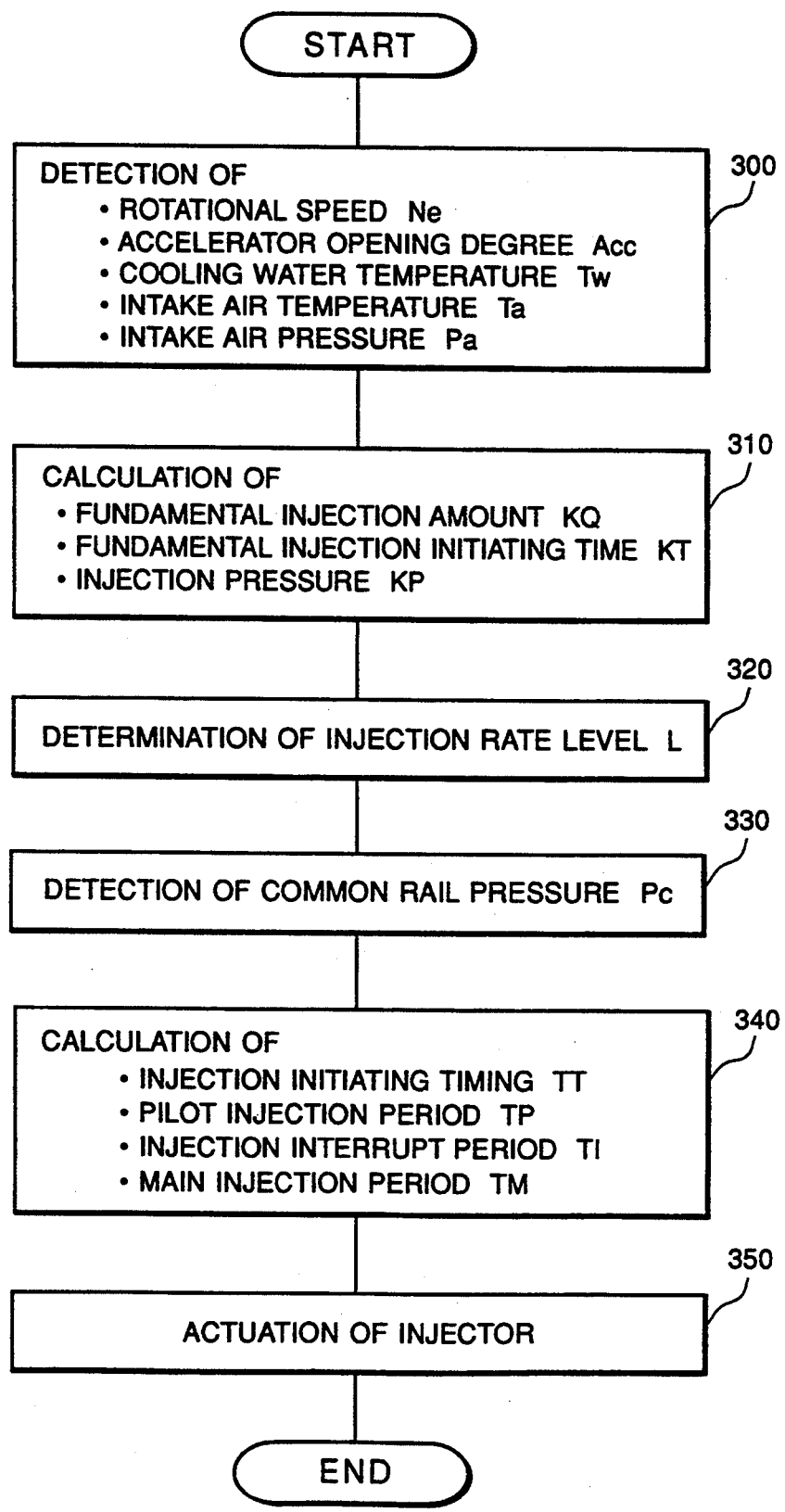
FIG. 14 is a flowchart showing a control procedure of the fuel injection control in accordance with the second embodiment.

Hereinafter a control procedure for actuating the injector 3, which the ECU 6 executes by use of the injector actuating circuit 20, will be explained with reference to the flowchart of FIG. 14.

First, in a step S300, the ECU 6 detects through various sensors the driving condition of the engine 2 such as an engine rotational speed Ne, an accelerator opening degree Acc, a cooling water temperature Tw, an intake air temperature Ta, an intake air pressure Pa and others.

In the subsequent step S310, the ECU 6 calculates several fundamental control values including an injection amount KQ, an injection initiating timing KT, an injection pressure KP on the basis of the detected driving condition.

Figures 15, 16:
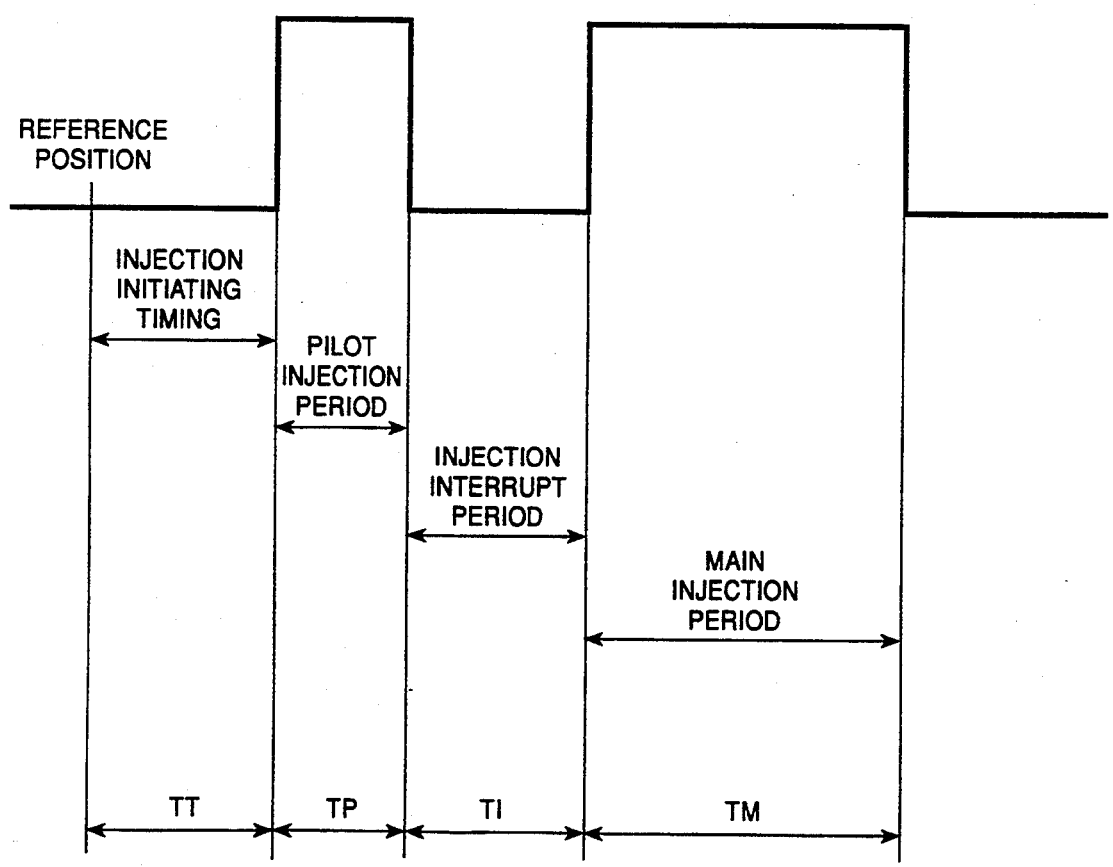
FIG. 15 is a table showing an injection rate level (L) determining map.
FIG. 16 is a timing chart showing the injection periods for the injector.

Next in a step S320, the ECU 6 determines a fundamental injection rate on the basis of the engine rotational speed Ne and the accelerator opening degree Acc with reference to an injection rate level (L) determining map shown in FIG. 15, in which a fundamental injection rate level L is classified into 5 grades in accordance with the driving condition (i.e. the engine load Acc and the engine rotational speed Ne) as will be described later in detail. This fundamental level L can be further modified in accordance with the cooling water temperature Tw.

Next in a step S330, the ECU 6 detects a common rail pressure Pc. Furthermore in a step S340, the ECU 6 calculates an injection initiating timing TT measured from a predetermined reference crank angle in terms of an elapsed time, a pilot injection period TP, an injection interrupt period TI, and a main injection period TM as shown in FIG. 16, on the basis of the injection amount KQ, the injection initiating timing KT, the common rail pressure Pc, and the injection rate level L obtained in the previous steps S310, S320, and S330.

Explained hereinafter will be a procedure for calculating respective periods TT, TP, TI, and TM.

(1) The injection initiating timing TT is determined in accordance with the following equation (4). In this equation, TBASE represents an ordinary injection initiating timing and TA represents a correction value to be set in accordance with previously described injection rate level L as shown in FIG. 17(A).

$$TT = TBASE - TA \qquad (4)$$

Figure 17A:
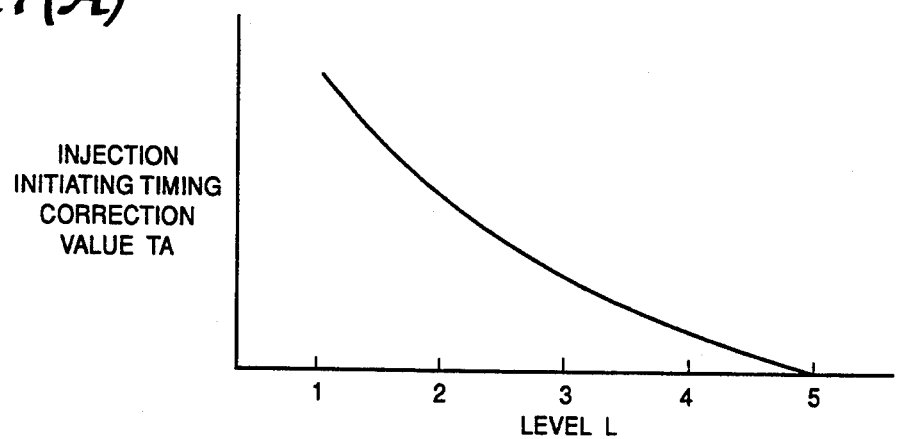
FIGS. 17(A) through 17(C) are graphs showing the relationship between the injection rate level (L) and the injection timing correction value TA, the pilot injection period TP, and the injection interrupt period TI.

As can be understood from FIG. 17(A), TA decreases with increasing injection rate level L. Therefore, the injection initiating timing TT is advanced as the injection rate level L decreases.

Figure 17B:
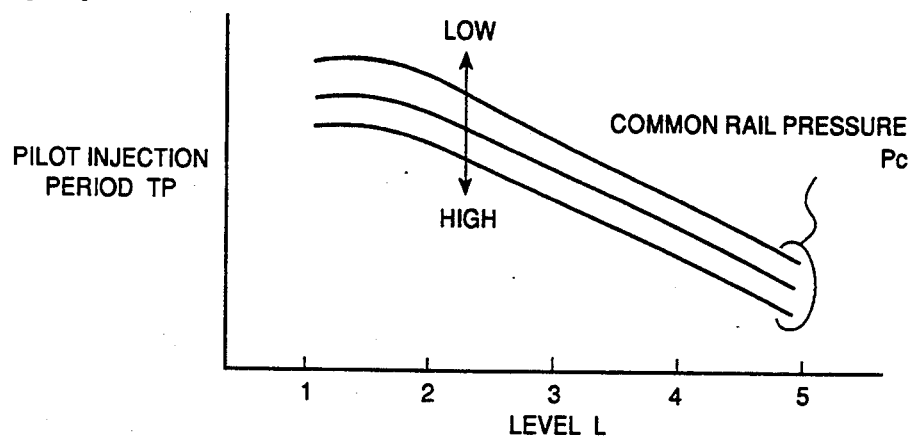

(2) The pilot injection period TP is determined on the basis of the injection rate level L and the common rail pressure Pc as shown in FIG. 17(B). The pilot injection period TP is set smaller when the common rail pressure is higher, because a relatively large amount of fuel is injected when the common rail pressure is high. Furthermore, the pilot injection period TP is set larger as the injection rate level L decreases. As shown in FIG. 15, the injection rate level L decreases as the engine load Acc decreases and as the engine rotational speed Ne decreases. Therefore, the pilot injection period TP is set larger with decreasing engine load Acc and engine rotational speed Ne.

Figure 17C:
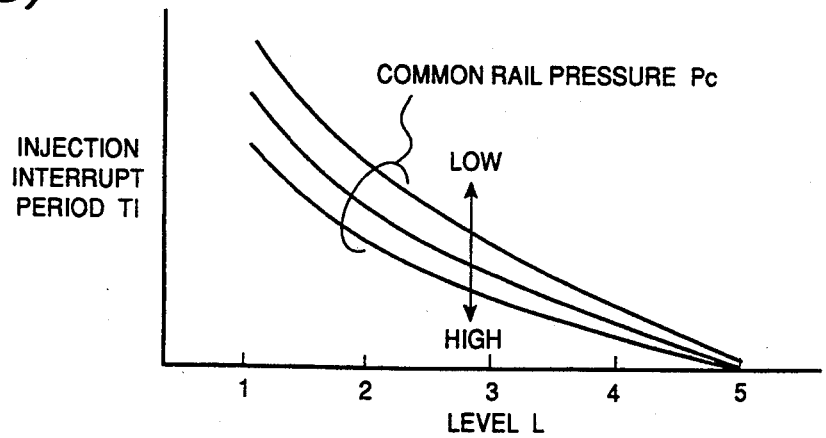

(3) The injection interrupt period TI is determined by the injection rate level L and the common rail pressure Pc as shown in FIG. 17(C). The injection interrupt period TI is set smaller when the common rail pressure is higher, because the pilot injection period TP is set smaller as shown in FIG. 17(C). The injection interrupt TI is set smaller as the injection rate level L increase, i.e. as the engine load Acc increases and the engine rotational speed Ne increases. By setting the injection interrupt period TI smaller, a required amount of the magnetic flux density is obtained as shown in FIG. 2.

(4) The main injection period TM determining a main injection fuel amount is determined on the basis of the injection amount calculated in the previous step S310 and the common rail pressure Pc as shown in FIG. 9.

Then, in a subsequent step S350, the ECU 6 actuates the injector 3 on the basis of the respective periods TT, TP, TI, TM calculated in the step 340, and then completes this procedure.

Figure 18:
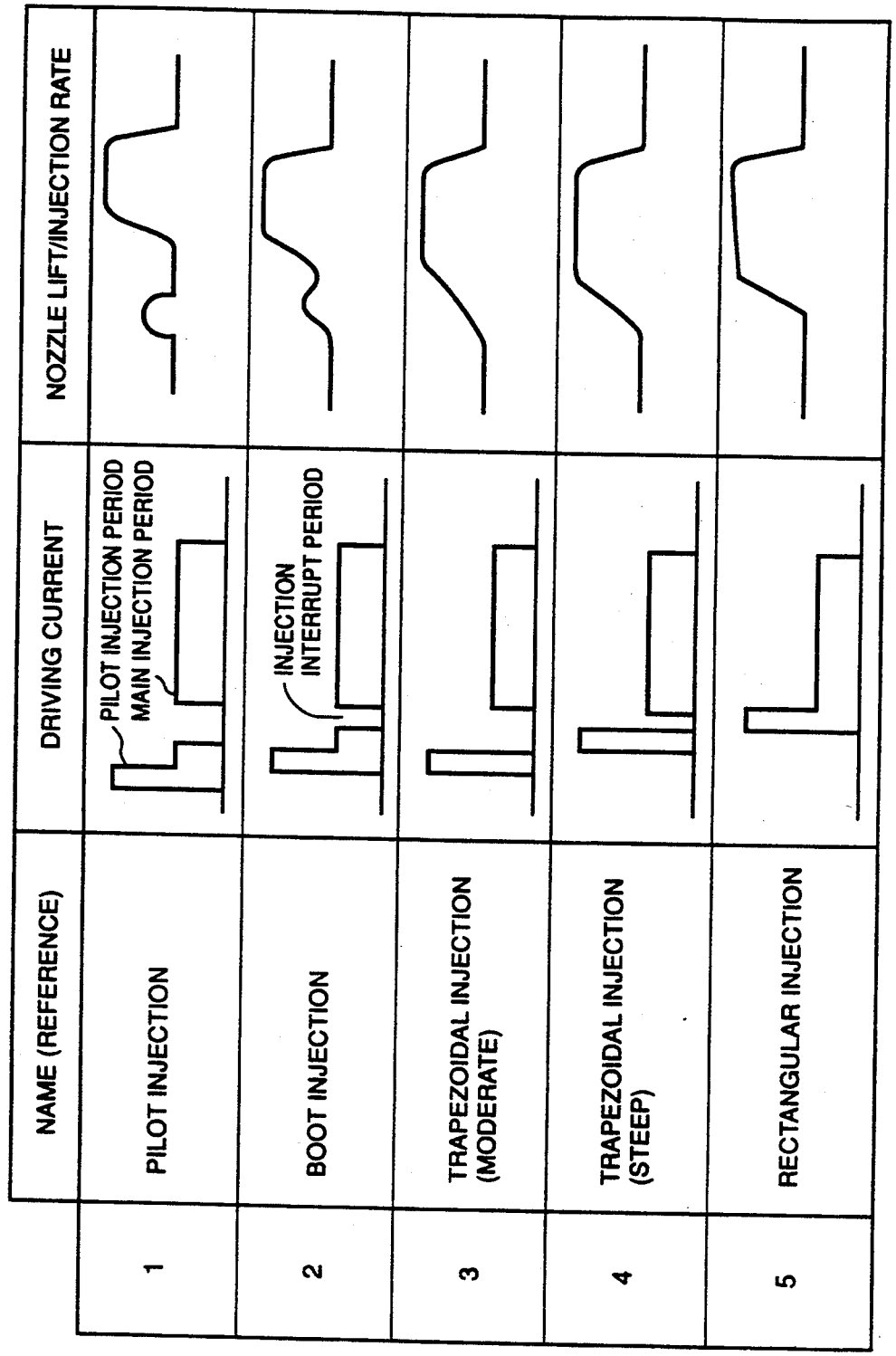
FIG. 18 is a table illustrating various injection patterns.

That is, in this embodiment, the second transistor T2 is actuated to serve as a switch means on the basis of the respective periods TT, TP, TI, TM determined in accordance with previous injection rate level L. Accordingly, as shown in FIG. 18, modification of the driving current pattern can realize any type of activated conditions of the injector 3 before the injector 3 opens the valve. With this modification of the driving current, an initial building-up of the nozzle lift (i.e. injection rate) is optimized by selecting an appropriate one of various injection types, e.g. a pilot injection, a boot injection, a trapezoidal injection, a rectangular injection so as to fit to the driving condition. Selecting one of various injection types is easy to perform, and therefore is advantageous in simplifying or facilitating the fuel injection control.

Especially in the trapezoidal injection in accordance with the present embodiment, the adjustment of the pilot injection pulse TP and the injection interrupt period TI will allow the magnetic flux to remain adequately in the injector solenoid 21. This brings a remarkable effect of optionally varying the building-up (inclination) rate of the nozzle lift curve.

Figure 19:
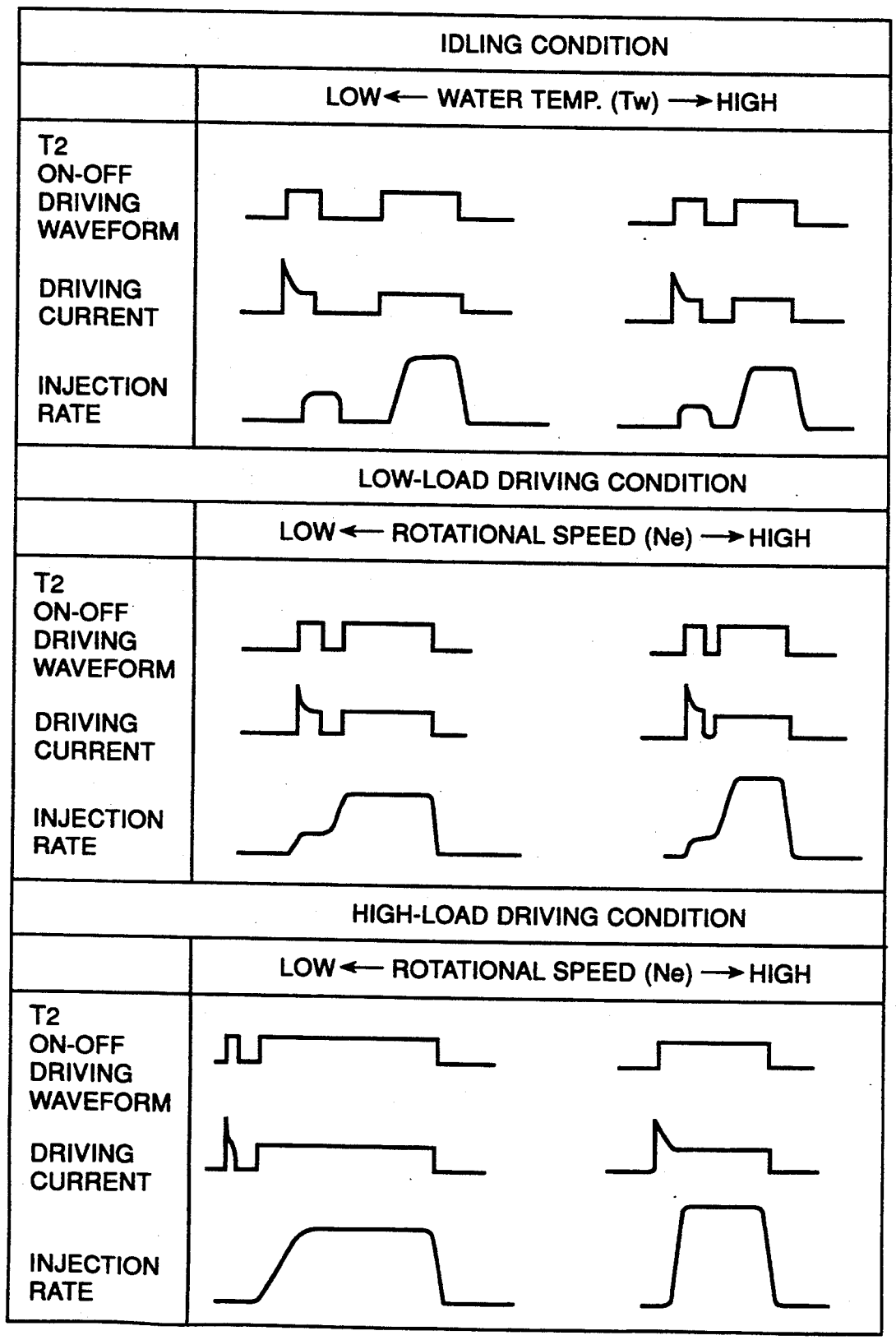
FIG. 19 is a table illustrating injection conditions in accordance with various driving condition.
Figure 20A:
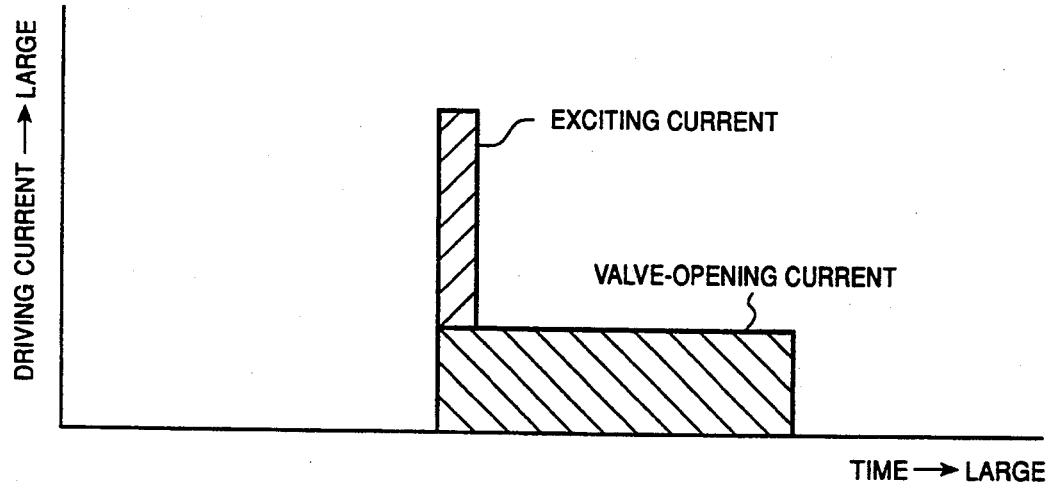
FIGS. 20(A) and 20(B) are views illustrating conventional art.
Figure 20B:
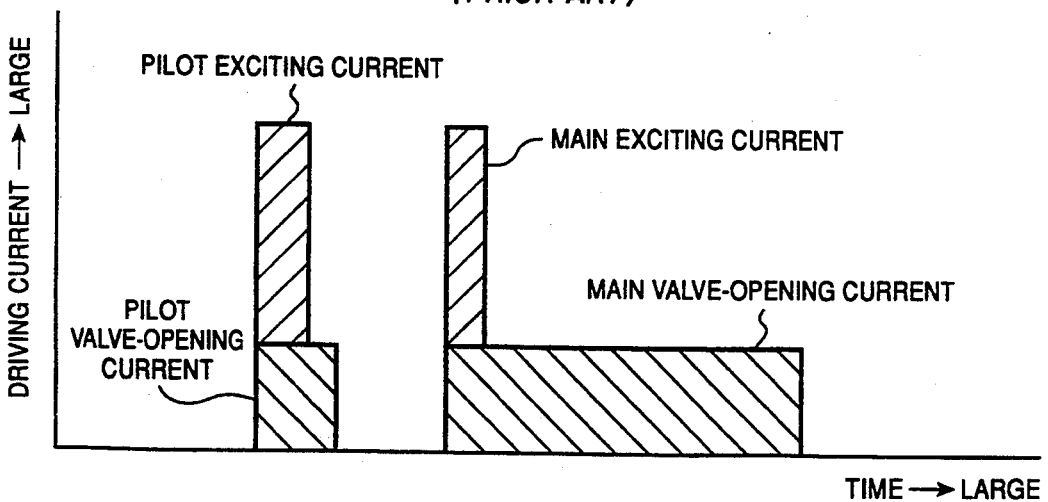

In more detail, as shown for example in FIG. 19, the injection rate can be appropriately set in accordance with the cooling water temperature Tw or the engine rotational speed Ne in the initial stage of the fuel injection in any of an idling condition, a low-load driving condition, and a high-load driving condition. Hence, this makes it possible to reduce the noise of the diesel engine 2 and NOx amount emitted from the same.

Needless to say, the present invention is not limited to the disclosed embodiment; therefore various modification would be possible within the scope of the invention without departing from the spirit of the invention.

For example, instead of using the electric circuit consisting of the coil L, the first transistor T1, and the capacitor C, the same function can be attained by controlling the actuation timing of the first transistor T2 so as to determine the pilot injection period TP, the main injection period TM, and the injection interrupt period TI. The residual magnetic field in the injector solenoid 21 would be adjusted adequately to control the initial stage of the fuel injection. Such a modification will be advantageous in simplifying the circuit configuration as well as bringing the same effect as the previous embodiment.

As is apparent from the foregoing description, the fuel injection apparatus for an internal combustion engine in accordance with this embodiment provides the adjusting means, by which the pilot injection period, the main injection period, and the injection interrupt period can be adequately set. The fuel injection valve is actuated in accordance with this setting so as to appropriately vary the initial injection rate of the main fuel injection. Accordingly, the present embodiment makes it possible to realize an optimum fuel injection control for a diesel engine. As a result, with an apparatus simple in configuration, the present embodiment brings a remarkable effect of reducing noise of the diesel engine and NOx emitted from the same.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to be embraced by the claims.

What is claimed is:

1. A fuel injection control apparatus for an internal combustion engine comprising:
   a fuel injection valve for injecting fuel into an internal combustion engine;
   an electromagnetic actuator for opening and closing said fuel injection valve;
   a current supply means for supplying current to said electromagnetic actuator;
   a sensor means for detecting a driving condition of said internal combustion engine;
   a control means for controlling said electromagnetic actuator through said current supply means in response to an output of said sensor means, so as to adjust fuel injection amount injected through said fuel injection valve in accordance with the driving condition of the internal combustion engine;
   said control means comprising a pilot injection means for activating said electromagnetic actuator during a predetermined pilot injection period (TP) so as to cause said fuel injection valve to perform a pilot injection, an injection interrupt means for deactivating said electromagnetic actuator during a predetermined injection interrupt period (TI) so as to interrupt fuel injection after said pilot injection period (TP), and a main injection means for activating said electromagnetic actuator during a predetermined main injection period (TM) after said injection interrupt period (TI) so as to cause said fuel injection valve to perform a main injection; and
   an adjusting means for adjusting at least one of a timing and a length of at least either of said pilot injection period (TP), injection interrupt period (TI), and main injection period (TM) in response to the output of said sensor means, so that main fuel injection can be adjusted in accordance with a residual magnetic flux remaining in said electromagnetic actuator at an initiating timing of said main injection period.

2. A fuel injection control apparatus in accordance with claim 1, wherein said adjusting means adjusts at least one of a timing and a length of at least either of said pilot injection period (TP), injection interrupt period (TI), and main injection period (TM), so as to adjust a fuel injection amount of said main injection at a desired amount.

3. A fuel injection control apparatus in accordance with claim 2, wherein said adjusting means includes a main injection period adjusting means for modifying a length of said main injection period (TM) on the basis of an indication value representing a residual magnetic flux remaining in said electromagnetic actuator after said pilot injection period (TP), so as to set a final main injection period (TM').

4. A fuel injection control apparatus in accordance with claim 3, wherein said main injection period adjusting means obtains said final main injection period (TM') on the basis of at least one of said pilot injection period (TP) and a time lag (TDF) between said pilot and main injection periods in their injection initiating timings.

5. A fuel injection control apparatus in accordance with claim 4, wherein said main injection period adjusting means includes:
  main injection period setting means for setting a main injection period (TM) in accordance with the output of said sensor means;
  correction amount setting means for setting a correction amount ($\Delta$TQM) on the basis of at least one of said pilot injection period (TP) and said time lag (TDF); and
  main injection period correction means for correcting said main injection period (TM) by said correction amount ($\Delta$TQM) to obtain said final main injection period (TM').

6. A fuel injection control apparatus in accordance with claim 1, wherein said adjusting means adjusts at least one of a timing and a length of at least either of said pilot injection period (TP), injection interrupt period (TI), and main injection period (TM), so as to adjust a fuel injection timing of said main injection at a desired timing.

7. A fuel injection control apparatus in accordance with claim 6, wherein said adjusting means includes a main injection timing adjusting means for modifying a main injection initiating timing (TTM) on the basis of an indication value representing a residual magnetic flux remaining in said electromagnetic actuator after said pilot injection period (TP), so as to set a final main injection initiating timing (TTM').

8. A fuel injection control apparatus in accordance with claim 7, wherein said main injection timing adjusting means obtains said final main injection initiating timing (TTM') on the basis of at least one of said pilot injection period (TP) and a time lag (TDF) between said pilot and main injection periods in their initiating timings.

9. A fuel injection control apparatus in accordance with claim 8, wherein said main injection timing adjusting means includes:
  main injection initiating timing setting means for setting a main injection initiating timing (TTM) in accordance with the output of said sensor means;
  correction amount setting means for setting a correction amount ($\Delta$T) on the basis of at least one of said pilot injection period (TP) and said time lag (TDF); and
  main injection initiating timing correcting means for correcting said main injection initiating timing (TTM) by said correction amount ($\Delta$T) to obtain said final main injection initiating timing (TTM').

10. A fuel injection control apparatus in accordance with claim 9, wherein said main injection timing adjusting means includes a pilot injection initiating timing setting means for setting a pilot injection initiating timing (TTP) in accordance with the output of said sensor means; and a pilot injection initiating timing correcting means for correcting said pilot injection initiating timing (TTP) by said correction amount ($\Delta$T) to obtain a final pilot injection initiating timing (TTP').

11. A fuel injection control apparatus in accordance with claim 2, wherein said adjusting means adjusts at least one of a timing and a length of at least either of said pilot injection period (TP), injection interrupt period (TI), and main injection period (TM), so as to adjust a fuel injection timing of said main injection at a desired timing.

12. A fuel injection control apparatus in accordance with claim 11, wherein said adjusting means includes a main injection timing adjusting means for modifying a main injection initiating timing (TTM) on the basis of an indication value representing a residual magnetic flux remaining in said electromagnetic actuator after said pilot injection period (TP), so as to set a final main injection initiating timing (TTM').

13. A fuel injection control apparatus in accordance with claim 12, wherein said main injection timing adjusting means obtains said final main injection initiating timing (TTM') on the basis of at least one of said pilot injection period (TP) and a time lag (TDF) between said pilot and main injection periods in their initiating timings.

14. A fuel injection control apparatus in accordance with claim 13, wherein said main injection timing adjusting means includes a main injection initiating timing setting means for setting a main injection timing (TTM) in accordance with the output of said sensor means;
  a correction amount setting means for setting a correction amount ($\Delta$T) on the basis of at least one of said pilot injection period (TP) and said time lag (TDF); and
  a main injection timing correcting means for correcting said main injection initiating timing (TTM) by said correction amount ($\Delta$T) to obtain said final main injection initiating timing (TTM').

15. A fuel injection control apparatus in accordance with claim 14, wherein said main injection timing adjusting means includes a pilot injection initiating timing setting means for setting a pilot injection initiating timing (TTP) in accordance with the output of said sensor means; and a pilot injection initiating timing correcting means for correcting said pilot injection initiating timing (TTP) by said correction amount ($\Delta$T) to obtain a final pilot injection initiating timing (TTP').

16. A fuel injection control apparatus in accordance with claim 1, wherein said adjusting means adjusts at least one of a timing and a length of said main injection period in accordance with an activated condition of said electromagnetic actuator prior to said main injection period, so as to optimize at least one of said fuel injection timing and said fuel injection amount of said main injection.

17. A fuel injection control apparatus in accordance with claim 1, wherein said adjusting means adjusts at least one of a timing and a length of at least either of said pilot injection period (TP), injection interrupt period (TI), and main injection period (TM), so that an injector nozzle lift of said fuel injection valve builds up in a desired manner in said main injection.

18. A fuel injection control apparatus in accordance with claim 17, wherein said adjusting means includes a selecting means for selecting an appropriate one of predetermined injection rate changing patterns in accordance with the output of said sensor means; and a setting means for setting said pilot injection period (TM) and injection interrupt period (TI) on the basis of the injection rate changing pattern selected by said selecting means.

19. A fuel injection control apparatus in accordance with claim 1, wherein said fuel injection valve injects fuel into a combustion chamber of said internal combustion engine, and said sensor includes a rotational speed sensor generating signals synchronously with operating cycles of said internal combustion engine, said pilot injection means, said injection interrupt means, and said main injection means respond to outputs from said rotational speed so as to perform said pilot injection, said main injection, and an injection interrupt between them during one operating cycle of said internal combustion engine.

20. A fuel injection control apparatus in accordance with claim 19, wherein said internal combustion engine is a 4-cycle engine, and said pilot injection means, said injection interrupt means, and said main injection means perform said pilot injection, main injection, and injection interrupt therebetween in the vicinity of a top dead center in a compression stroke of said internal combustion engine.

* * * * *